US012589399B2

(12) United States Patent
Nakashima et al.

(10) Patent No.: US 12,589,399 B2
(45) Date of Patent: Mar. 31, 2026

(54) WATER DISCHARGE DEVICE

(71) Applicant: TOTO LTD., Kitakyushu (JP)

(72) Inventors: Takahiro Nakashima, Kitakyushu (JP); Ryohei Yaita, Kitakyushu (JP); Yuki Moriizumi, Kitakyushu (JP); Takeshi Murashita, Kitakyushu (JP); Kanako Hanashiro, Kitakyushu (JP)

(73) Assignee: Toto Ltd., Fukuoka (JP)

( * ) Notice: Subject to any disclaimer, the term of this patent is extended or adjusted under 35 U.S.C. 154(b) by 209 days.

(21) Appl. No.: 18/573,515

(22) PCT Filed: Dec. 8, 2022

(86) PCT No.: PCT/JP2022/045280

§ 371 (c)(1),
(2) Date: Dec. 22, 2023

(87) PCT Pub. No.: WO2023/106370

PCT Pub. Date: Jun. 15, 2023

(65) Prior Publication Data

US 2024/0173728 A1 May 30, 2024

(30) Foreign Application Priority Data

Dec. 10, 2021 (JP) ................................ 2021-201062
Feb. 28, 2022 (JP) ................................ 2022-029008

(51) Int. Cl.

*B05B 1/34* (2006.01)
*A47K 3/28* (2006.01)
*B05B 1/02* (2006.01)
*B05B 1/18* (2006.01)
*B05B 17/06* (2006.01)

(52) U.S. Cl.

CPC ................ *B05B 1/341* (2013.01); *A47K 3/28* (2013.01); *B05B 1/02* (2013.01); *B05B 1/18* (2013.01); *B05B 17/06* (2013.01)

(58) Field of Classification Search

CPC .. B05B 1/341; B05B 1/02; B05B 1/08; B05B 1/18; B05B 17/06; A47K 3/28; F15C 1/22

(Continued)

(56) References Cited

U.S. PATENT DOCUMENTS

| | | | |
|---|---|---|---|
| 4,190,207 | A | 2/1980 | Cammack et al. |
| 2011/0108640 | A1 | 5/2011 | Grohe et al. |

(Continued)

FOREIGN PATENT DOCUMENTS

| | | |
|---|---|---|
| CN | 102029229 A | 4/2011 |
| CN | 107149991 A | 9/2017 |

(Continued)

OTHER PUBLICATIONS

The Chinese Official Action dated Sep. 4, 2025 (English translation).

(Continued)

*Primary Examiner* — Christopher S Kim
(74) *Attorney, Agent, or Firm* — BakerHostetler

(57) ABSTRACT

A water discharge device that discharges water while reciprocally vibrating the water. The water discharge device includes a water discharge device body and a vibration generating element. The vibration generating element includes a water supply path, a collision portion, a vortex street path, and a discharge path. The vortex street path is formed by fitting an upstream fitting portion of an upstream member and a downstream fitting portion of a downstream member to each other. The upstream member or the downstream member is provided with a vibration reducing portion that reduces vibration of the upstream member due to vortices generated in the vortex street path. The upstream fitting portion or the downstream fitting portion is elastically (Continued)

deformed by a predetermined amount due to the provision of the vibration reducing portion.

19 Claims, 28 Drawing Sheets

(58) Field of Classification Search
USPC .............................................. 239/589.1, 553
See application file for complete search history.

(56) References Cited

U.S. PATENT DOCUMENTS

| | | | |
|---|---|---|---|
| 2017/0165687 | A1 | 6/2017 | Ukigai et al. |
| 2017/0252758 | A1 | 9/2017 | Lin et al. |
| 2019/0060846 | A1 | 2/2019 | Juan |

FOREIGN PATENT DOCUMENTS

| | | | |
|---|---|---|---|
| JP | S54-500111 | A | 12/1979 |
| JP | 2013128651 | A | 7/2013 |
| JP | 2017-108830 | A | 6/2017 |
| JP | 2017-109153 | A | 6/2017 |
| JP | 2018-167164 | A | 11/2018 |
| JP | 2018166685 | A | 11/2018 |
| JP | 2020-146661 | A | 9/2020 |
| JP | 2021-35439 | A | 3/2021 |

OTHER PUBLICATIONS

The Japanese Office Action dated Dec. 10, 2025 (English translation).

| A | B |
|---|---|
|  |  |

WATER DISCHARGE DEVICE

CROSS-REFERENCE TO RELATED APPLICATIONS

This application is a National Stage of International patent application PCT/JP2022/045280, filed on Dec. 8, 2022, which claims priority to foreign Japanese patent application No. JP 2021-201062, filed on Dec. 10, 2021, and Japanese patent application No. JP 2022-029008, filed on Feb. 28, 2022, the disclosures of which are incorporated by reference in their entireties.

TECHNICAL FIELD

The present invention relates to a water discharge device and particularly relates to a water discharge device that discharges water while reciprocally vibrating the water.

BACKGROUND ART

Japanese Patent Laid-open No. 2021-35439 (Patent Literature 1) discloses a water discharge device. The water discharge device includes a vibration generating element that discharges supplied water while reciprocally vibrating the water. The vibration generating element includes a water supply path, a hot/cold water collision portion provided at a downstream end of the water supply path, a vortex generation path that guides vortices generated when water collides with the hot/cold water collision portion, and a water discharge port path provided downstream of the vortex generation path. Water supplied to the water discharge device flows into the water supply path of the vibration generating element and collides with the hot/cold water collision portion provided at the downstream end of the water supply path. When water collides with the hot/cold water collision portion, vortices in mutually opposite directions are generated in the vortex generation path on the downstream side and guided toward downstream through the vortex generation path. Water flow including the vortices guided through the vortex generation path is discharged from the water discharge port path, which has a flow passage cross-sectional area smaller than that of the vortex generation path, while being reciprocally vibrated.

In the vibration generating element disclosed in Patent Literature 1, the hot/cold water collision portion is provided between the water supply path and the vortex generation path, and the water discharge port path having a small flow passage cross-sectional area is provided downstream of the vortex generation path. Since the vibration generating element has such a structure, it is difficult to integrally shape the vibration generating element with resin. Thus, the vibration generating element disclosed in Patent Literature 1 is formed by fitting a first member and a second member to each other, the first member including the water supply path, the hot/cold water collision portion, and an upstream part of the vortex generation path, the second member including a downstream part of the vortex generation path.

In the vibration generating element disclosed in Patent Literature 1, the first member on the upstream side is formed of a hard member, and the second member on the downstream side is formed of a soft member. Accordingly, abnormal noise generated from the vibration generating element due to hunting is reduced. Specifically, when hot/cold water flows into a substantially rectangular inflow port (water supply path) of the vibration generating element, the inflow port repeats deformation that the inflow port becomes flat and then returns to the original shape, and abnormal noise is generated due to the deformation. In the vibration generating element disclosed in Patent Literature 1, the first member including the water supply path is formed of a hard member to reduce member deformation, and accordingly, reduce generation of abnormal noise.

Japanese Patent Laid-open No. 2017-108830 (Patent Literature 2) discloses a water discharge device. The water discharge device includes a vibration generating element that discharges supplied water while reciprocally vibrating the water. The vibration generating element includes a water supply path, a collision portion provided at a downstream end of the water supply path, a vortex generation path that guides vortices generated when water collides with the collision portion, and a water discharge port path provided downstream of the vortex generation path. Water supplied to the water discharge device flows into the water supply path of the vibration generating element and collides with the collision portion provided at the downstream end of the water supply path. When water collides with the collision portion, vortices in mutually opposite directions are generated in the vortex generation path on the downstream side and guided toward downstream through the vortex generation path. Water flow including the vortices guided through the vortex generation path is discharged from the water discharge port path, which has a flow passage cross-sectional area smaller than that of the vortex generation path, while being reciprocally vibrated.

CITATION LIST

Patent Literature

Patent Literature 1: Japanese Patent Laid-open No. 2021-35439

Patent Literature 2: Japanese Patent Laid-open No. 2017-108830

SUMMARY OF INVENTION

Technical Problem

However, the inventors of the present invention found that even when generation of abnormal noise due to hunting is reduced as in the invention disclosed in Patent Literature 1, abnormal noise is still generated from the vibration generating element due to other mechanisms.

The vibration generating element disclosed in Patent Literature 2 discharges water in line while reciprocally vibrating the water, and accordingly, can land the water in a wide range with a compact configuration. Thus, when applied to a shower device, the vibration generating element disclosed in Patent Literature 2 is expected to provide a comfort feeling of shower while the freedom of showerhead designing is ensured. However, with the vibration generating element disclosed in Patent Literature 2, the landing range of water discharge only extends linearly long when the angle of reciprocal vibration of water discharge is increased to further increase the landing range, and landing area cannot be sufficiently increased. Specifically, when the vibration generating element is applied to a shower device, the landing range becomes linearly long but an increased amount of water does not land on a user body and is wasted, and the feeling of shower is not much improved.

Thus, the present invention is intended to provide a water discharge device capable of sufficiently reducing abnormal noise generated from a vibration generating element. The present invention is also intended to provide a water discharge device capable of ensuring a sufficiently large landing area with a compact configuration.

Solution to Problem

To solve the above-described problem, the present invention provides a water discharge device that discharges water while reciprocally vibrating the water. The water discharge device includes a water discharge device body, and a vibration generating element that is provided in the water discharge device body and discharges water while reciprocally vibrating the water in a predetermined vibration plane. The vibration generating element includes a water supply path into which supplied water flows, a collision portion that is disposed at a downstream end portion of the water supply path to block part of a flow passage section of the water supply path and generates vortices in mutually opposite directions downstream of the collision portion when water guided through the water supply path collides with the collision portion, a vortex street path that is provided downstream of the water supply path to guide vortices formed by the collision portion, and a discharge path through which water guided through the vortex street path is discharged. The vortex street path is formed by fitting, to each other, an upstream fitting portion of an upstream member at which an upstream side of the vortex street path is formed and a downstream fitting portion of a downstream member at which a downstream side of the vortex street path is formed. One of the upstream fitting portion and the downstream fitting portion is formed of a soft material, and the other is formed of a hard material having an elastic modulus larger than the elastic modulus of the soft material. The upstream member or the downstream member is provided with a vibration reducing portion that reduces vibration of the upstream member due to vortices generated in the vortex street path. The fitting portion formed of the soft material among the upstream fitting portion and the downstream fitting portion is elastically deformed by a predetermined amount due to the provision of the vibration reducing portion when the upstream fitting portion and the downstream fitting portion are fitted to each other.

In the present invention thus configured, water having flowed into the water supply path of the vibration generating element provided in the water discharge device body collides with the collision portion, and vortices in mutually opposite directions are generated downstream of the collision portion. Water flow including the generated vortices is guided through the vortex street path on the downstream side and discharged from the discharge path while being reciprocally vibrated in the predetermined vibration plane. The vortex street path is formed by connecting the upstream member at which the upstream side of the vortex street path is formed and the downstream member at which the downstream side of the vortex street path is formed. Specifically, the vortex street path is formed by fitting the upstream fitting portion provided in the upstream member and the downstream fitting portion provided in the downstream member to each other. In addition, the upstream member or the downstream member is provided with the vibration reducing portion that reduces vibration of the upstream member due to vortices generated in the vortex street path, and the fitting portion formed of the soft material among the upstream fitting portion and the downstream fitting portion is elastically deformed by the predetermined amount due to the provision of the vibration reducing portion when the upstream fitting portion and the downstream fitting portion are fitted to each other.

The inventors of the present invention have found that abnormal noise generated from the vibration generating element still cannot be sufficiently reduced even when the upstream member constituting the vortex street path of the vibration generating element is formed of a hard material to reduce abnormal noise generated due to hunting. Through diligent research, the inventors of the present invention have found the generated abnormal noise is attributable to aeolian tone generated in the vibration generating element. Specifically, when hot/cold water collides with the collision portion provided in the vibration generating element and Karman vortices are generated downstream of the collision portion, the aeolian tone is generated due to the vortices. The generated aeolian tone vibrates the entire upstream member of the vibration generating element, thereby generating annoying abnormal noise. The abnormal noise generated attributable to the aeolian tone, which is caused by vibration of the upstream member as a whole, has a different generation mechanism from that of abnormal noise attributable to hunting occurring due to deformation of the upstream member, and thus cannot be sufficiently reduced even when the upstream member is formed of a hard material.

According to the present invention configured as described above, the upstream member or the downstream member is provided with the vibration reducing portion that reduces vibration of the upstream member due to vortices generated in the vortex street path, and the fitting portion formed of the soft material among the upstream fitting portion and the downstream fitting portion is elastically deformed by the predetermined amount due to the provision of the vibration reducing portion when the upstream fitting portion and the downstream fitting portion are fitted to each other. Accordingly, the upstream member is solidly fixed to the downstream member so that when the aeolian tone is generated inside the upstream member, vibration of the upstream member attributable to the aeolian tone can be reduced and generation of abnormal noise can be sufficiently reduced. Moreover, according to the present invention configured as described above, since one of the upstream fitting portion and the downstream fitting portion is formed of the soft material and the other is formed of the hard material, vibration of the upstream member can be attenuated by the viscosity of the soft material and generation of abnormal noise can be sufficiently reduced.

In the present invention, it is preferable that the vibration reducing portion be provided at part of the upstream fitting portion or the downstream fitting portion at least downstream of the collision portion. As described above, the aeolian tone is generated at part of the vibration generating element downstream of the collision portion. According to the present invention configured as described above, since the vibration reducing portion is provided at the part downstream of the collision portion, the upstream member can be strongly fixed at a site where the aeolian tone is generated, and abnormal noise attributable to the aeolian tone can be more effectively reduced.

In the present invention, it is preferable that the vibration reducing portion elastically deform the fitting portion formed of the soft material among the upstream fitting portion and the downstream fitting portion at least in a direction parallel to the vibration plane.

Karman vortices generated downstream of the collision portion of the vibration generating element cause pressure variation in the direction parallel to the vibration plane and generate the aeolian tone. Accordingly, vibration of the upstream member attributable to the aeolian tone occurs in the direction parallel to the vibration plane. According to the present invention configured as described above, since the vibration reducing portion elastically deforms the upstream fitting portion or the downstream fitting portion at least in the direction parallel to the vibration plane, motion of the upstream member in the direction parallel to the vibration plane can be more strongly reduced and generation of abnormal noise can be effectively reduced.

In the present invention, it is preferable that the vibration reducing portion elastically deform the fitting portion formed of the soft material among the upstream fitting portion and the downstream fitting portion in a direction parallel to the vibration plane and in a direction orthogonal to the vibration plane.

According to the present invention thus configured, since the vibration reducing portion elastically deforms the upstream fitting portion or the downstream fitting portion in the direction parallel to the vibration plane and the direction orthogonal to the vibration plane, the upstream member is solidly fixed so that generation of abnormal noise can be more effectively reduced.

In the present invention, it is preferable that the water discharge device body be provided with a plurality of the vibration generating elements and the downstream members of the vibration generating elements be integrated. According to the present invention thus configured, since the downstream members of the plurality of vibration generating elements are integrated, the stiffness of the downstream members can be increased even when the downstream members are formed of a soft material, and vibration of the upstream members can be sufficiently reduced.

In the present invention, it is preferable that the water discharge device body be provided with a plurality of the vibration generating elements, the downstream members of the vibration generating elements be integrated while the upstream members of the plurality of vibration generating elements be separated.

According to the present invention thus configured, since the downstream members of the plurality of vibration generating elements are integrated to increase the stiffness of the downstream members and the upstream members of the plurality of vibration generating elements are separated, vibration of the plurality of upstream members can be prevented from reinforcing each other through resonance and generation of abnormal noise can be reliably reduced.

In the present invention, it is preferable that the vibration reducing portion be formed as a ribbed protrusion provided on a surface of the upstream fitting portion or the downstream fitting portion. According to the present invention thus configured, since the vibration reducing portion is formed as the ribbed protrusion, the amount of elastic deformation of the upstream fitting portion or the downstream fitting portion can be easily controlled and an appropriate abnormal noise reducing effect can be obtained.

In the present invention, it is preferable that the vortex street path be formed with a width in a direction parallel to the vibration plane and a height in a direction orthogonal to the vibration plane, the width being larger than the height, a flow diffusion portion be provided halfway through the vortex street path, the flow diffusion portion be constituted by a stepped portion formed to narrow a flow passage through the vortex street path toward downstream in a height direction, and the stepped portion have a height equal to or smaller than 50% of the height of the vortex street path.

In the present invention thus configured, supplied water flows into the water supply path of the vibration generating element provided in the water discharge device body. The water having flowed collides with the collision portion disposed to block part of the flow passage section of the water supply path, vortices in mutually opposite directions are generated downstream of the collision portion, and water flow including the generated vortices is guided through the vortex street path provided downstream of the water supply path. Then, the water guided through the vortex street path is discharged through the discharge path while being reciprocally vibrated in the vibration plane. A flow diffusion portion constituted by a stepped portion formed to narrow a flow passage through the vortex street path toward downstream in a height direction is provided halfway through the vortex street path.

According to the present invention thus configured, since vortices generated in mutually opposite directions downstream of the collision portion are guided through the vortex street path and discharged from the discharge path, the discharged water can be reciprocally vibrated in the predetermined vibration plane. Moreover, since the stepped portion that narrows the flow passage through the vortex street path in the height direction is provided as the flow diffusion portion halfway through the vortex street path, the water discharged from the discharge path is diffused also in the direction orthogonal to the vibration plane. Accordingly, sufficiently large landing area can be ensured with a compact configuration.

In the present invention, it is preferable that the discharge path have a height equal to or larger than a minimum height of the vortex street path. According to the present invention thus configured, since the height of the discharge path is equal to or larger than the minimum height of the vortex street path, water diffused in the height direction of the vortex street path by the flow diffusion portion and discharged from the discharge path can be easily diffused in the direction orthogonal to the vibration plane.

In the present invention, it is preferable that the vortex street path be formed by connecting the upstream member at which the upstream side of the vortex street path is formed and the downstream member at which the downstream side of the vortex street path is formed.

According to the present invention thus configured, since the vortex street path is formed by connecting the upstream member and the downstream member, the vibration generating element including the water supply path, the collision portion, the vortex street path, and the discharge path can be easily molded.

In the present invention, it is preferable that the stepped portion be formed at a part where the upstream member and the downstream member are connected. According to the present invention thus configured, since the stepped portion is formed at the part where the upstream member and the downstream member are connected, the stepped portion can be easily molded as the flow diffusion portion halfway through the vortex street path.

In the present invention, it is preferable that a height at an upstream end of the vortex street path provided in the downstream member be smaller than a height at a downstream end of the vortex street path provided in the upstream member. According to the present invention thus configured, since the height at the upstream end of the vortex street path provided in the downstream member is smaller than the height at the downstream end of the vortex street path provided in the upstream member, a stepped portion that narrows the flow passage through the vortex street path toward downstream in the height direction can be reliably formed at the part where the upstream member and the downstream member are connected.

In the present invention, it is preferable that the vortex street path provided in the downstream member have a constant height. According to the present invention thus configured, since the height of the vortex street path provided in the downstream member is constant, collapse of vortices generated when water collides with the collision portion can be reduced and vortex streets can be reliably guided.

In the present invention, it is preferable that the stepped portion be formed halfway through the vortex street path formed in the downstream member. According to the present invention thus configured, since the stepped portion is formed halfway through the vortex street path formed in the downstream member, the distance from the collision portion to the stepped portion is long so that vortices can be sufficiently developed before reaching the stepped portion as the flow diffusion portion.

In the present invention, it is preferable that the stepped portion be provided on one inner wall surface facing in the direction parallel to the vibration plane among inner wall surfaces of the vortex street path. According to the present invention thus configured, since the stepped portion is provided on one inner wall surface facing in the direction parallel to the vibration plane, the height of the vortex street path downstream of the stepped portion can be sufficiently ensured, flow can be diffused in the direction orthogonal to the vibration plane as well while being reciprocally vibrated in the predetermined vibration plane.

In the present invention, it is preferable that the vortex street path have a constant height in the direction orthogonal to the vibration plane downstream of the stepped portion, and an inner wall surface of the vortex street path facing the stepped portion be bent to expand a flow passage through the vortex street path toward downstream in a height direction.

According to the present invention thus configured, since the vortex street path has a constant height downstream of the stepped portion and the inner wall surface of the vortex street path facing the stepped portion is bent to expand the flow passage through the vortex street path toward downstream in the height direction, the direction of flow of water passing through the vortex street path can be changed to a direction toward the inner wall surface facing the stepped portion and the water can be diffused in the direction orthogonal to the vibration plane.

In the present invention, it is preferable that the vibration generating element include a bypass path through which water flows into the vortex street path from downstream of the collision portion, and part of an inner wall surface of the bypass path be formed by the downstream member.

According to the present invention thus configured, since the vibration generating element includes the bypass path, for example, the amplitude of reciprocal vibration of water discharged from the vibration generating element can be adjusted also by the flow rate of water flowing in from the bypass path. Moreover, since part of the inner wall surface of the bypass path is formed by the downstream member, the vibration generating element including the bypass path can be easily molded.

In the present invention, it is preferable that, in the bypass path, only an inner wall surface positioned most downstream be formed by the downstream member. According to the present invention thus configured, since, in the bypass path, only the inner wall surface positioned most downstream is formed by the downstream member, a part where the flow passage cross-sectional area changes when the upstream member and the downstream member are connected can be separated from the collision portion so that vortices formed by the collision portion can be sufficiently developed.

In the present invention, it is preferable that the upstream member be formed of a hard member and the downstream member be formed of a soft member. According to the present invention thus configured, since the upstream member is formed of the hard member, deformation of the vortex street path due to water pressure can be reduced at a part on the upstream side where water pressure is relatively high. Moreover, since the downstream member is formed of the soft member, even when a calcium component contained in tap water is accumulated and solidified in the discharge path at the downstream end, the accumulated calcium component (scale) can be easily removed by elastically deforming part of the discharge path.

Advantageous Effects of Invention

With a water discharge device of the present invention, it is possible to sufficiently reduce abnormal noise generated from a vibration generating element. Moreover, with the water discharge device of the present invention, it is possible to ensure sufficiently large landing area with a compact configuration.

DESCRIPTION OF EMBODIMENTS

Figure 1:
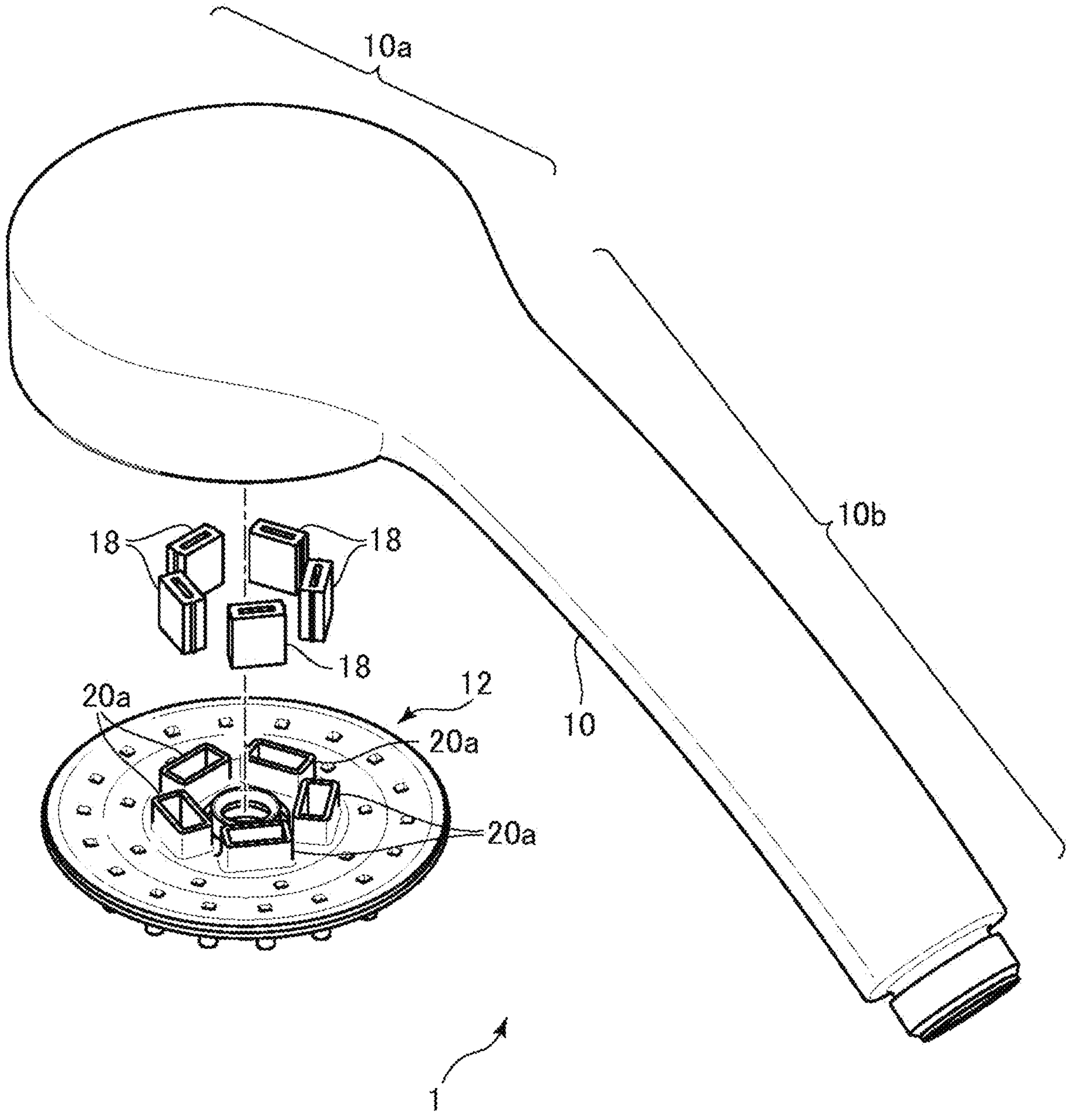
FIG. 1 is an exploded perspective view of a water discharge device according to a first embodiment of the present invention when viewed from above.
Figure 2:
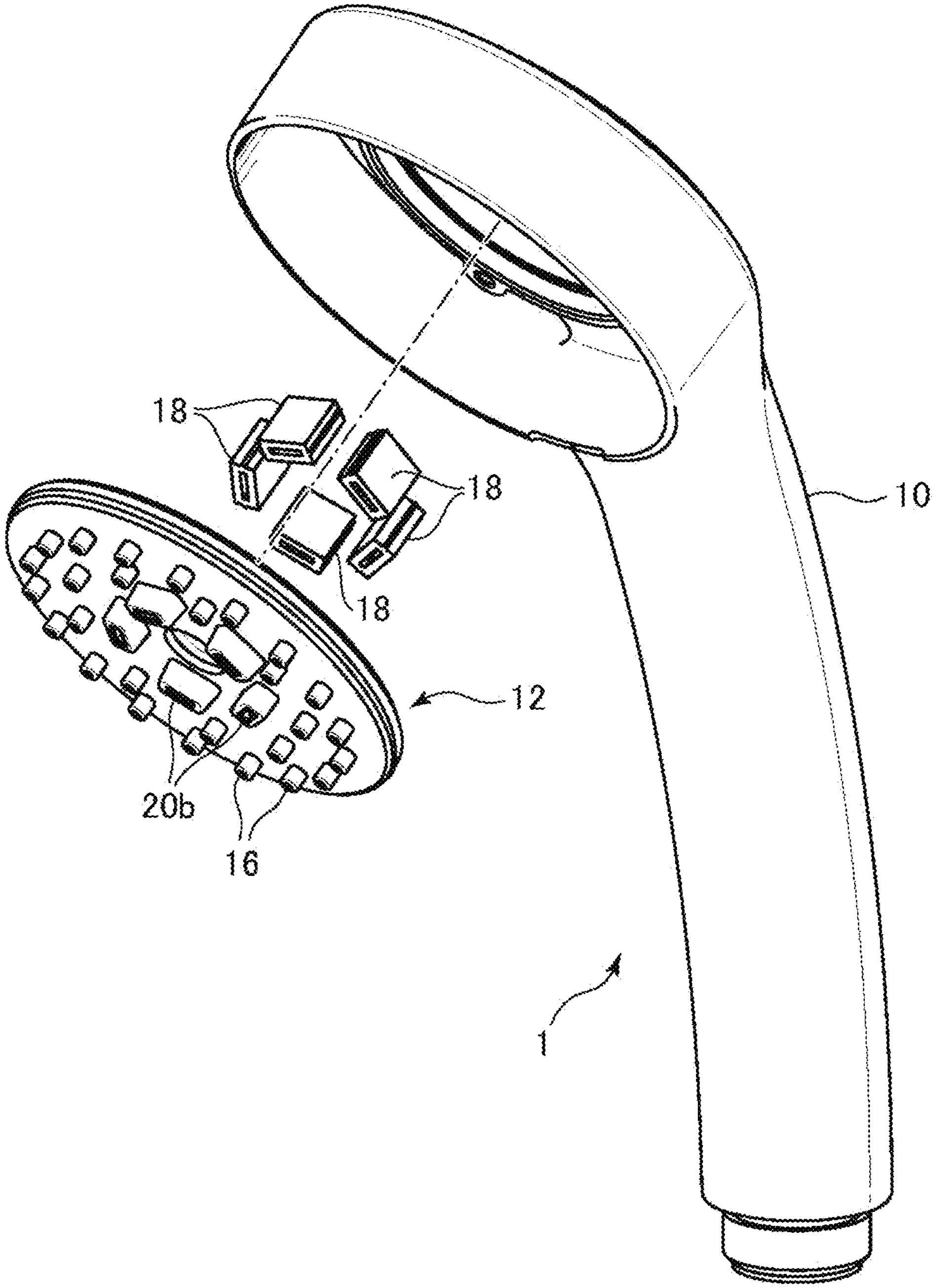
FIG. 2 is an exploded perspective view of the water discharge device according to the first embodiment of the present invention when viewed from below.

Water discharge devices according to embodiments of the present invention will be described below with reference to the accompanying drawings. FIG. 1 is an exploded perspective view of a water discharge device according to a first embodiment of the present invention when viewed from above. FIG. 2 is an exploded perspective view of the water discharge device according to the first embodiment of the present invention when viewed from below.

As illustrated in FIGS. 1 and 2, a water discharge device 1 according to the present embodiment is what is called a hand shower and includes a water discharge device body 10, a water spray plate 12 attached to the water discharge device body 10, and a plurality of upstream members 18 attached to a back surface of the water spray plate 12.

The water discharge device body 10 includes a water discharge head unit 10*a* and a grasping unit 10*b* and is formed such that supplied water flows inside. The water spray plate 12 is a member having a substantially circular disk shape and attached to the water discharge head unit 10*a* of the water discharge device body 10. As illustrated in FIG. 2, a plurality of cylindrical water spray nozzles 16 are provided as protrusions on a front surface of the water spray plate 12.

As illustrated in FIG. 1, the five upstream members 18 are attached alongside in an annular shape to the back surface side of the water spray plate 12 and constitute five vibration generating elements together with part of the water spray plate 12. Each vibration generating element discharges supplied water while reciprocally vibrating the water in a predetermined vibration plane. Details of the vibration generating elements will be described later.

The water discharge device 1 according to the present embodiment has a configuration in which supplied water flows into the water discharge device body 10 and is discharged as shower through the water spray nozzles 16 of the water spray plate 12 attached to the water discharge head unit 10*a* and the vibration generating elements. Water discharged from each water spray nozzle 16 is discharged in one line, and water discharged from each vibration generating element is discharged while being reciprocally vibrated in the predetermined vibration plane.

Figure 3:
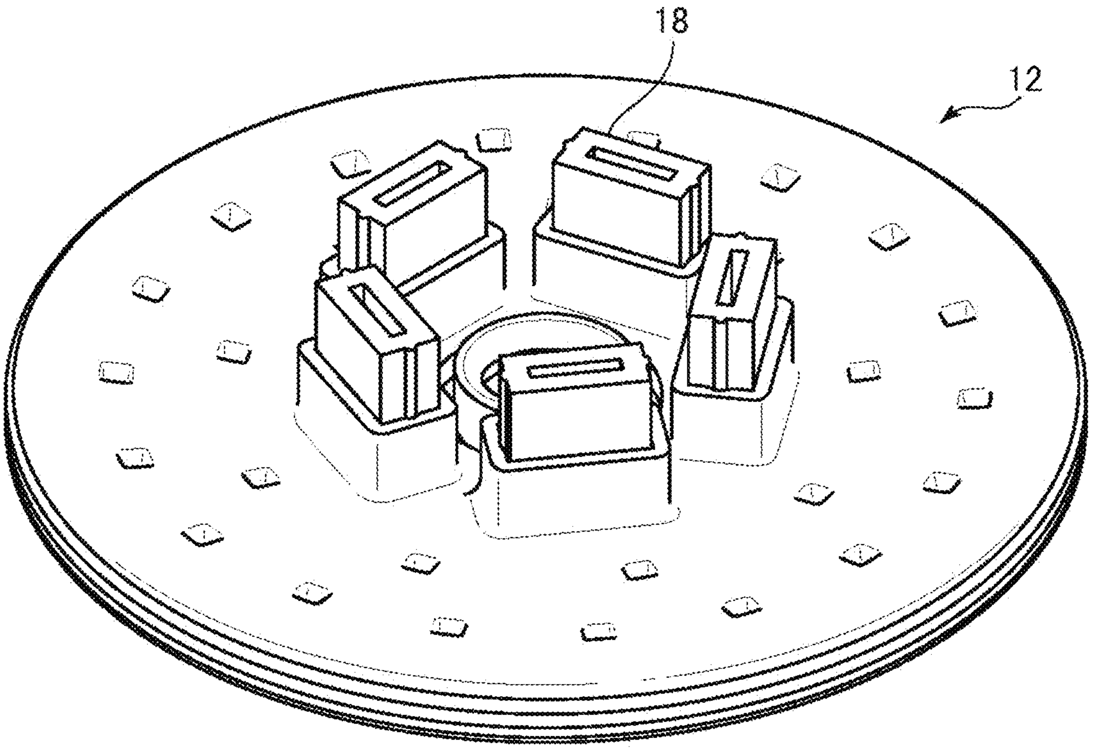
FIG. 3 is a perspective view illustrating a state in which each upstream member is attached to a water spray plate in the water discharge device according to the first embodiment of the present invention.
Figure 4:
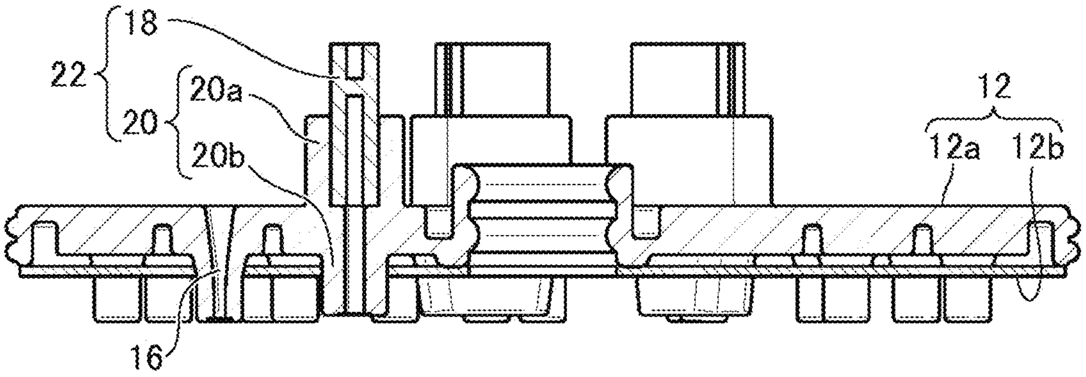
FIG. 4 is a cross-sectional view of the state in which each upstream member is attached to the water spray plate in the water discharge device according to the first embodiment of the present invention.
Figure 5:
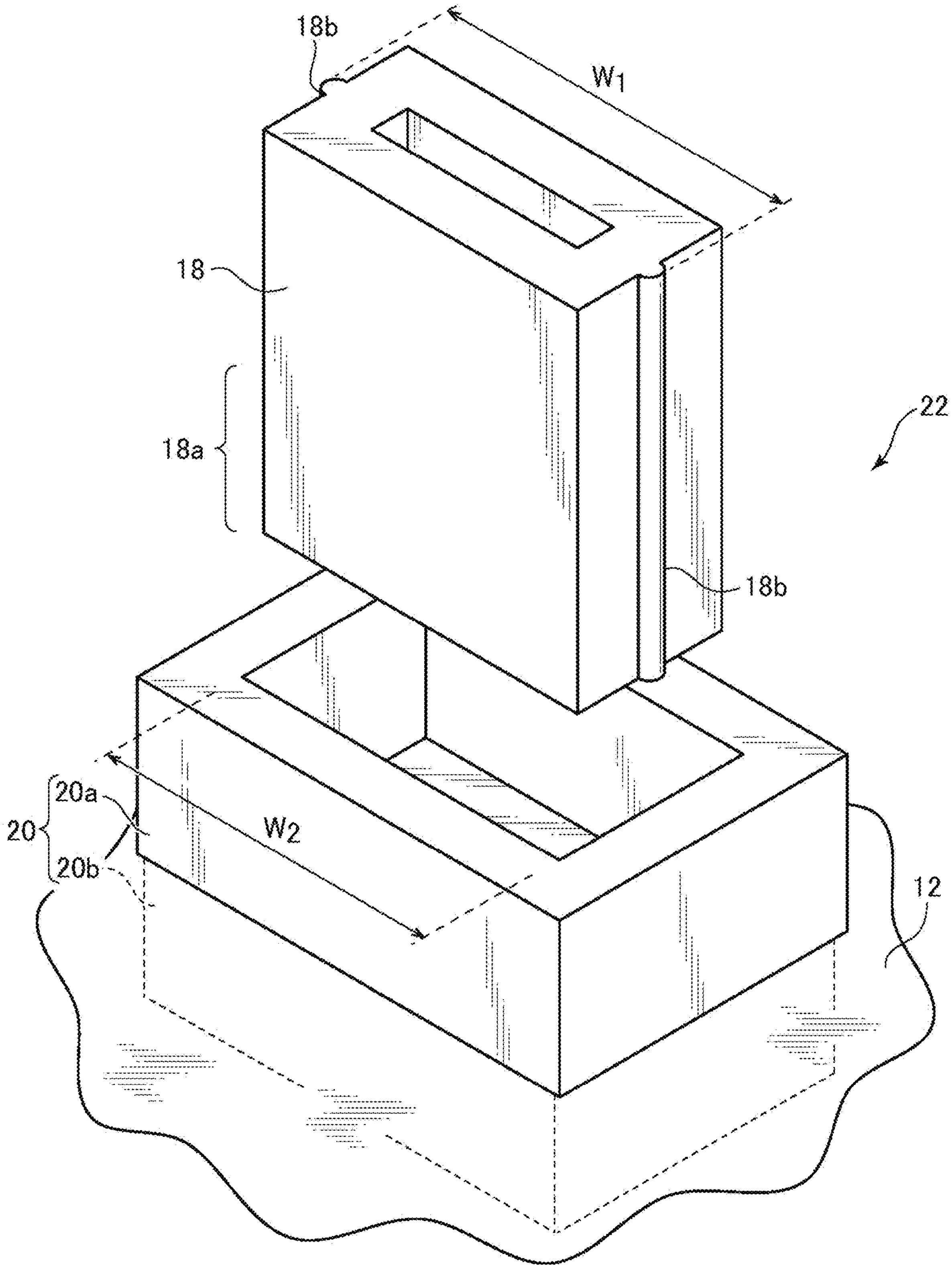
FIG. 5 is a perspective view illustrating a state in which an upstream member is removed from the water spray plate in the water discharge device according to the first embodiment of the present invention.
Figure 6:
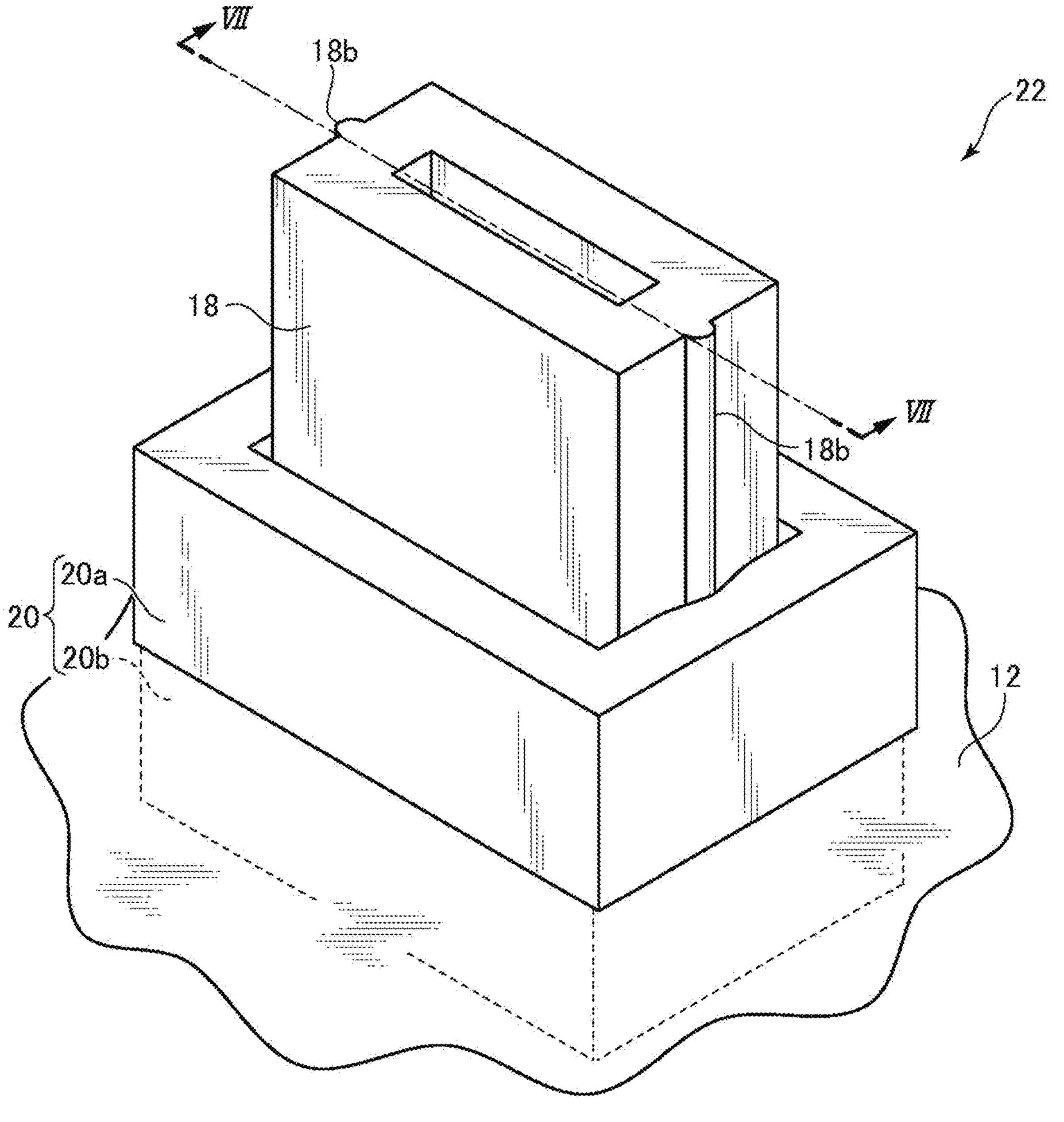
FIG. 6 is a perspective view illustrating a state in which the upstream member is attached to the water spray plate in the water discharge device according to the first embodiment of the present invention.
Figure 7:
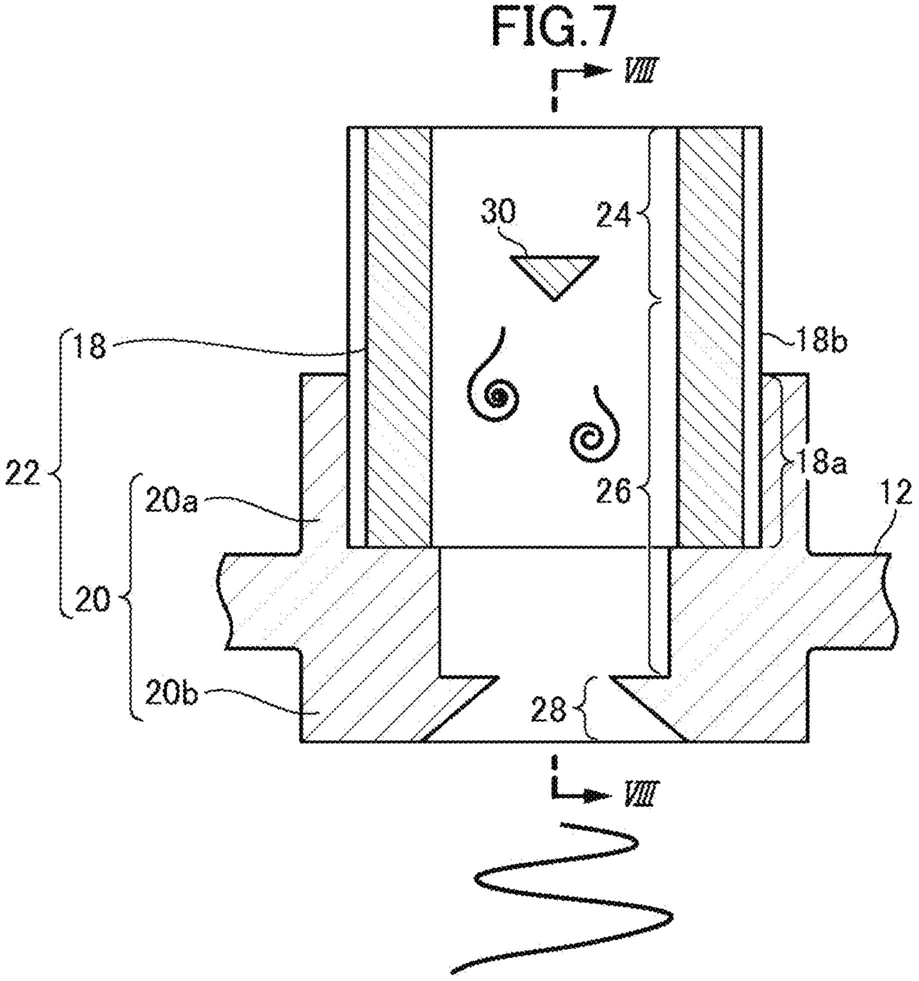
FIG. 7 is a cross-sectional view of the water discharge device according to the first embodiment of the present invention along line VII-VII in FIG. 6.
Figure 8:
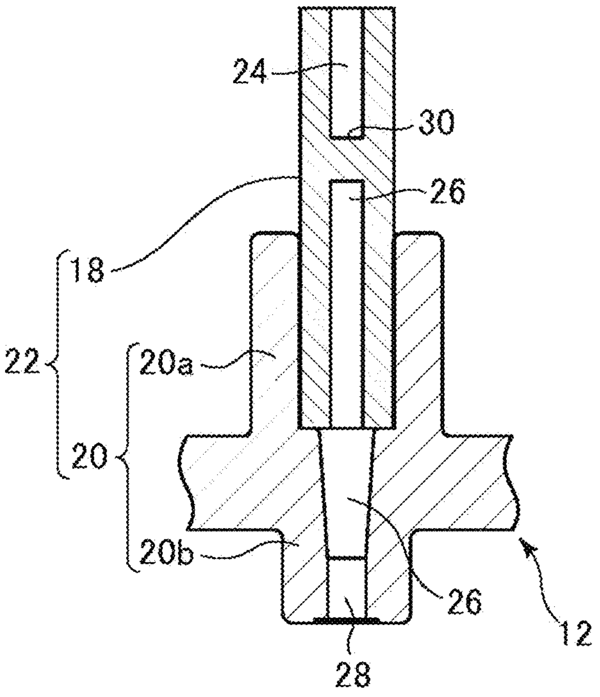
FIG. 8 is a cross-sectional view of the water discharge device according to the first embodiment of the present invention along line VIII-VIII in FIG. 7.

Each vibration generating element will be described below with reference to FIGS. 3 to 8 in addition. FIG. 3 is a perspective view illustrating a state in which each upstream member 18 is attached to the water spray plate 12, and FIG. 4 is a cross-sectional view of the state. FIGS. 5 and 6 are enlarged perspective views illustrating one upstream member 18 and part of the water spray plate 12 to which the upstream member 18 is attached, FIG. 5 illustrating a state in which the upstream member is removed, FIG. 6 illustrating a state in which the upstream member is attached to the water spray plate. FIG. 7 is a cross-sectional view along line VII-VII in FIG. 6, and FIG. 8 is a cross-sectional view along line VIII-VIII in FIG. 7.

As illustrated in FIG. 4, the water spray plate 12 is constituted by a nozzle forming member 12*a* and a thin plate member 12*b* disposed on a front surface of the nozzle forming member 12*a*. The nozzle forming member 12*a* is constituted by a circular plate part and the plurality of water spray nozzles 16 formed to protrude on the front surface side from the plate part. The thin plate member 12*b* is constituted by a circular thin plate and provided with a plurality of holes through which the respective water spray nozzles 16 penetrate.

As illustrated in FIG. 5, a vibration generating element 22 is formed by connecting the upstream members 18 and downstream members 20. Specifically, in the present embodiment, the five upstream members 18 are arranged in an annular shape and connected to the five downstream members 20, respectively, formed integrally with the water spray plate 12 (the nozzle forming member 12*a* thereof), thereby constituting the five vibration generating elements 22 as illustrated in FIG. 3.

Specifically, as illustrated in FIG. 4, each downstream member 20 is constituted by a downstream fitting portion 20*a* (FIG. 1) formed as a protrusion on the back surface side of the water spray plate 12, and a protrusion portion 20*b* (FIG. 2) formed as a protrusion on the front surface side of the water spray plate 12. Accordingly, in the present embodiment, the upstream members 18 are fitted to the respective downstream fitting portions 20*a* protruding on the back surface side of the water spray plate 12, thereby constituting the five vibration generating elements 22 arrayed in an annular shape. In this manner, the water discharge device body 10 is provided with the plurality of vibration generating elements 22 in the present embodiment, the downstream members 20 of the five vibration generating elements 22 being integrated, the upstream members 18 of the five vibration generating elements 22 being separated.

In the present embodiment, the upstream members 18 are formed of a hard material (for example, polyacetal (POM)), and the water spray plate 12 (downstream members 20) is formed of a soft material (for example, thermoplastic elastomer (TPE)) having an elastic modulus smaller than that of the hard material. In the present embodiment, an upstream fitting portion 18*a* (FIG. 5) of a distal part of each upstream member 18 is fitted to the corresponding downstream fitting portion 20*a* formed on the back surface side of the water spray plate 12, and accordingly, both members are connected to each other. Note that the hard material may be any material having such a strength that the material does not deform under normal water supply pressure, and may be, for example, ABS resin (acrylonitrile-butadiene-styrene copolymer). The soft material only needs to be a member that can be easily elastically deformed when a user applies force thereto, and may be, for example, silicone rubber.

As illustrated in FIG. 7, each vibration generating element 22 includes a water supply path 24 into which supplied water flows, a vortex street path 26 provided downstream of the water supply path 24, and a discharge path 28 through which water guided through the vortex street path is discharged. In addition, a collision portion 30 is provided at a downstream end portion of the water supply path 24 to block part of a flow passage section of the water supply path 24. Each vibration generating element 22 discharges supplied water from a downstream end of the discharge path 28 while reciprocally vibrating the water in a vibration plane parallel to the sheet of FIG. 7.

The water supply path 24 is a path that has a section with a constant dimension and a constant shape and into which water having flowed into the water discharge device body 10 flows. The water supply path 24 is formed with a flat rectangular section having a width in a direction parallel to the vibration plane and a height in a direction orthogonal to the vibration plane, the width being larger than the height. The water supply path 24 is continuously provided with the vortex street path 26 formed downstream in the same sectional shape.

The collision portion 30 is provided at the downstream end portion of the water supply path 24 to block part of the flow passage section of the water supply path 24. Specifically, the collision portion 30 is provided to couple two inner wall surfaces parallel to the vibration plane and forming the water supply path 24 and the vortex street path 26 (FIG. 8). In the present embodiment, the collision portion 30 is formed in an isosceles right triangle shape when viewed in the direction orthogonal to the vibration plane, and is disposed at the center of the water supply path 24 such that the hypotenuse is positioned on the upstream side. When water guided through the water supply path 24 collides with the collision portion 30, vortices in mutually opposite directions are generated downstream of the collision portion 30.

The vortex street path 26 is formed downstream of the water supply path 24 to guide vortices formed by the collision portion 30. The vortex street path 26 is a path formed continuously with the water supply path 24 at an upstream part having the same sectional dimension and shape as a downstream end of the water supply path 24. Specifically, the vortex street path 26 is a path having a flat rectangular section and formed with a width in the direction parallel to the vibration plane and a height in the direction orthogonal to the vibration plane, the width being larger than the height. Vortices formed by the collision portion 30 move toward downstream while being guided and grown through the vortex street path 26. Note that, although the vortex street path 26 is formed with a constant width in the present embodiment, the vortex street path 26 may be formed with a width that decreases toward downstream as a modification.

The discharge path 28 is a flow passage connected downstream of the vortex street path 26 and discharges water guided through the vortex street path 26. The width of an upstream end of the discharge path 28 is smaller than the width of a downstream end of the vortex street path 26 and larger in a tapering manner toward downstream. As illustrated in FIG. 8, the height of the discharge path 28 in the direction orthogonal to the vibration plane is equal to the height of the vortex street path 26 on the downstream side and constant from the upstream end to the downstream end. Vortices generated in mutually opposite directions downstream of the collision portion 30 are grown through the vortex street path 26 and discharged from the discharge path 28. As the vortices in opposite directions alternately reach, the direction of water discharged from the discharge path 28 reciprocally vibrates in the vibration plane.

A divided structure of each vibration generating element 22 will be described below. As described above, each vibration generating element 22 is constituted by two members of an upstream member 18 and a downstream member 20, and a water supply path 24 and an upstream part of a vortex street path 26 are formed in the upstream member 18. In addition, a downstream part of the vortex street path 26 and a discharge path 28 are formed in the downstream member 20. In other words, the upstream side of the vortex street path 26 is formed in the upstream member 18, the downstream side of the vortex street path 26 is formed in the downstream member 20, and the vortex street path 26 is formed by connecting the upstream member 18 and the downstream member 20. Then, the upstream member 18 and the downstream member 20 are connected by fitting the upstream fitting portion 18*a* provided at a distal end (downstream end) of the upstream member 18 into the downstream fitting portion 20*a* provided at a proximal end (upstream end) of the downstream member 20, thereby constituting the vibration generating element 22.

Figure 9:
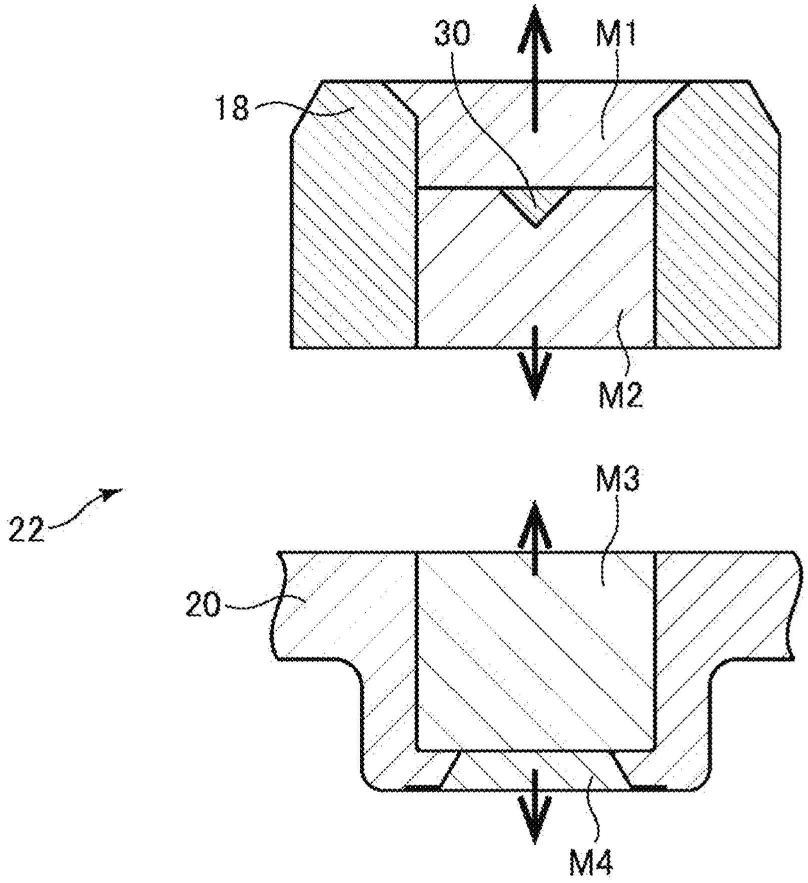
FIG. 9 is a diagram schematically illustrating each vibration generating element in the first embodiment of the present invention.

A manufacturing advantage of constituting each vibration generating element 22 with two members will be described below with reference to FIGS. 9 and 10. FIG. 9 is a diagram schematically illustrating the vibration generating element constituted by two members in the present embodiment, and FIG. 10 is a diagram schematically illustrating an integrated vibration generating element as a comparative example.

As illustrated in FIG. 9, the vibration generating element 22 according to the present embodiment is constituted by the upstream member 18 and the downstream member 20, and the vortex street path 26 is constituted by the two members. Accordingly, in a case in which the upstream member 18 is molded by injection molding, molds M1 and M2 are divided from each other at part of the collision portion 30 so that the molds M1 and M2 can be removed from the upstream side and the downstream side, respectively. Similarly, in a case in which the downstream member 20 is molded, molds M3 and M4 are divided from each other at the boundary between the vortex street path 26 and the discharge path 28 so that the molds M3 and M4 can be removed from the upstream side and the downstream side, respectively. Thus, the upstream member 18 and the downstream member 20 can be easily molded by injection molding or the like.

Figure 10:
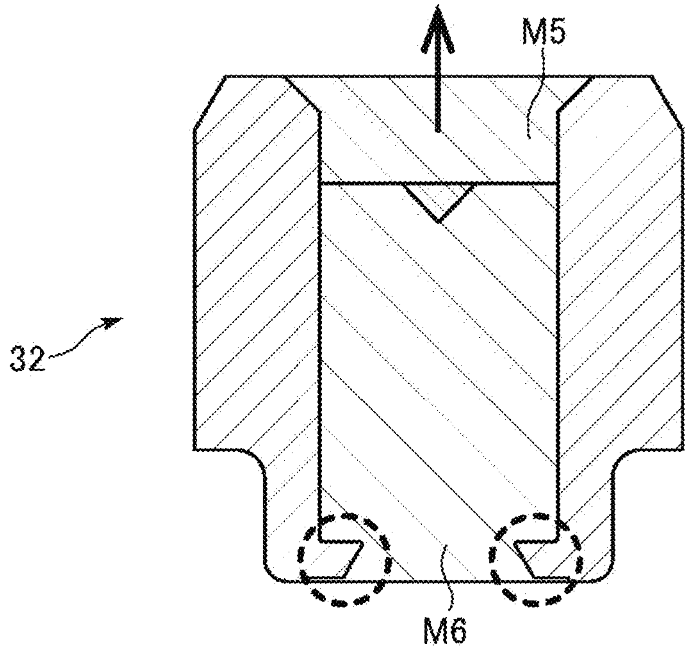
FIG. 10 is a diagram schematically illustrating an integrated vibration generating element as a comparative example.

As for an integrally molded vibration generating element 32 of the comparative example as illustrated in FIG. 10, a mold M5 can be removed from the upstream side in a case in which injection molding is performed, but a mold M6 is engaged with parts surrounded by dashed lines in the drawing. Accordingly, the mold M6 cannot be easily removed from the downstream side, and measures such as selecting an elastically deformable material as a material used for injection molding are needed to enable the easy removal. Thus, there is a certain constraint on material selection or the like in a case in which the vibration generating element is integrally molded, and the divided structure of the vibration generating element 22 as in the present embodiment has a large advantage.

Although the divided structure of the vibration generating element 22, which is constituted by the upstream member 18 and the downstream member 20, has a large advantage as described above, there is a problem that the entire upstream member 18 vibrates attributable to aeolian tone generated inside the vortex street path 26. To reduce generation of abnormal noise attributable to the aeolian tone, vibration reducing portions are provided on an outer wall surface of the upstream member 18 of the vibration generating element 22 included in the water discharge device 1 according to the present embodiment.

Specifically, in the vibration generating element 22 included in the water discharge device 1 according to the present embodiment, vibration reducing portions 18*b* are formed on side surfaces of the upstream member 18 in a substantially rectangular parallelepiped shape, the side surfaces being orthogonal to the vibration plane, as illustrated in FIG. 5. Each vibration reducing portion 18*b* is a ribbed protrusion having a semicircular section and extending in a longitudinal direction (direction in which water flows inside the vibration generating element 22) at the center of an outside side surface of the upstream member 18. The vibration reducing portions 18*b* are provided on the respective side surfaces of the upstream member 18 and extend in the longitudinal direction of the upstream member 18 from a proximal end of the upstream member 18 to a distal end of the upstream member 18. Accordingly, the vibration reducing portion 18*b* extends from the water supply path 24 of the vibration generating element 22 to halfway through the vortex street path 26. Alternatively, as a modification, the vibration reducing portions 18*b* may be provided only at part of the vibration generating element 22 downstream of the collision portion 30.

The upstream fitting portion 18*a* at the distal end of the upstream member 18 is inserted into the downstream fitting portion 20*a* at the proximal end of the downstream member 20, and the fitting portions are fitted to each other. In the present embodiment, the vibration reducing portions 18*b* are formed as ribbed protrusions provided on the surface of the upstream fitting portion 18*a*. A width $W_1$ between top portions of the respective ribbed protrusions forming the vibration reducing portions 18*b* is larger than a width $W_2$ between inner wall surfaces of the downstream fitting portion 20*a* receiving the upstream member 18. Accordingly, as illustrated in FIG. 6, when the upstream fitting portion 18*a* at the distal end of the upstream member 18 is fitted in the downstream fitting portion 20*a* at the proximal end of the downstream member 20, the inner wall surfaces of the downstream fitting portion 20*a* are elastically deformed by a predetermined amount in a direction parallel to the vibration plane and orthogonal to a direction in which the vortex street path 26 extends. In the present embodiment, the upstream member 18 is formed of the hard material, and the downstream member 20 is formed of the soft material. Accordingly, when the upstream member 18 is fitted in the downstream member 20, the upstream member 18 formed of the hard material mainly elastically deforms the inner wall surfaces of the downstream fitting portion 20*a* formed of the soft material. Specifically, when the upstream fitting portion 18*a* of the upstream member 18 fitted in the downstream fitting portion 20*a* of the downstream member 20, the ribbed vibration reducing portions 18*b* formed on the upstream fitting portion 18*a* elastically deform the inner wall surfaces of the downstream fitting portion 20*a*, facing the vibration reducing portions 18*b*, in the direction parallel to the vibration plane.

Note that, in the present embodiment, the width $W_1$ between the top portions of the respective ribbed protrusions forming the vibration reducing portions 18*b* is larger than the width $W_2$ between the inner wall surfaces of the downstream fitting portion 20*a* receiving the upstream member 18 by 0.5 mm approximately. Since the width $W_1$ is larger than the width $W_2$ and the upstream member 18 or the downstream member 20 is elastically deformed by a predetermined amount when the members are fitted to each other, the upstream member 18 is solidly fixed so that vibration of the upstream member 18 attributable to the aeolian tone can be reduced. Specifically, when the aeolian tone is generated inside the upstream member 18, vibration force in the direction parallel to the vibration plane acts on the upstream member 18, but vibration of the upstream member 18 in the direction parallel to the vibration plane can be effectively reduced since the vibration reducing portions 18*b* are provided on the side surfaces of the upstream member 18.

Although the upstream member 18 is inserted into the downstream member 20 to fit both members in the present embodiment, the present invention may have, as a modification, a configuration in which the downstream member is inserted into the upstream member to fit both members. In this case, the present invention may have a configuration in which the vibration reducing portions 18*b* are formed on inner wall surfaces of the upstream fitting portion 18*a* to elastically deform an outer wall surface of the downstream fitting portion 20*a* in the direction parallel to the vibration plane. Moreover, although the vibration reducing portions 18*b* are provided in the upstream member 18 in the present embodiment, the present invention may have, as a modification, a configuration in which the vibration reducing portions are provided in the downstream member 20.

In this manner, in a case in which the vibration reducing portions are provided in the downstream member 20, the upstream member 18 is formed of the hard material, and the downstream member 20 is formed of the soft material, the downstream fitting portion 20*a* at which the vibration reducing portions 18*b* are formed is elastically deformed in the direction parallel to the vibration plane by the inner wall surfaces of the upstream fitting portion 18*a*, facing the downstream fitting portion 20*a*, when the upstream fitting portion 18*a* is fitted in the downstream fitting portion 20*a*. In a case in which the upstream fitting portion 18*a* is formed of the soft material and the downstream member 20 is formed of the hard material, the inner wall surfaces of the upstream fitting portion 18*a*, facing the vibration reducing portions 18*b*, are elastically deformed in the direction parallel to the vibration plane by the vibration reducing portions 18*b* formed at the downstream fitting portion 20*a* when the upstream fitting portion 18*a* is fitted in the downstream fitting portion 20*a*.

In the present embodiment, the downstream member 20 is formed of the soft material and the upstream member 18 is formed of a hard material having an elastic modulus larger than that of the soft material, but as a modification, the downstream fitting portion 20*a* of the downstream member 20 may be formed of the hard material and the upstream fitting portion 18*a* of the upstream member 18 may be formed of the soft material. Moreover, the upstream member 18 and the downstream member 20 do not necessarily need to be formed of a single material but may be formed of a composite material of the soft material and the hard material. For example, the upstream member 18 may be molded as an integrated member of the soft material and the hard material by two-color molding, the upstream fitting portion 18*a* on the distal end side may be formed of the soft material, and the proximal end side of the upstream member 18 may be formed of the hard material. Accordingly, the proximal end side of the upstream member 18 can be formed of the hard material to reduce hunting deformation of the upstream member 18 whereas the upstream fitting portion 18*a* can be formed of the soft material.

Figure 11:
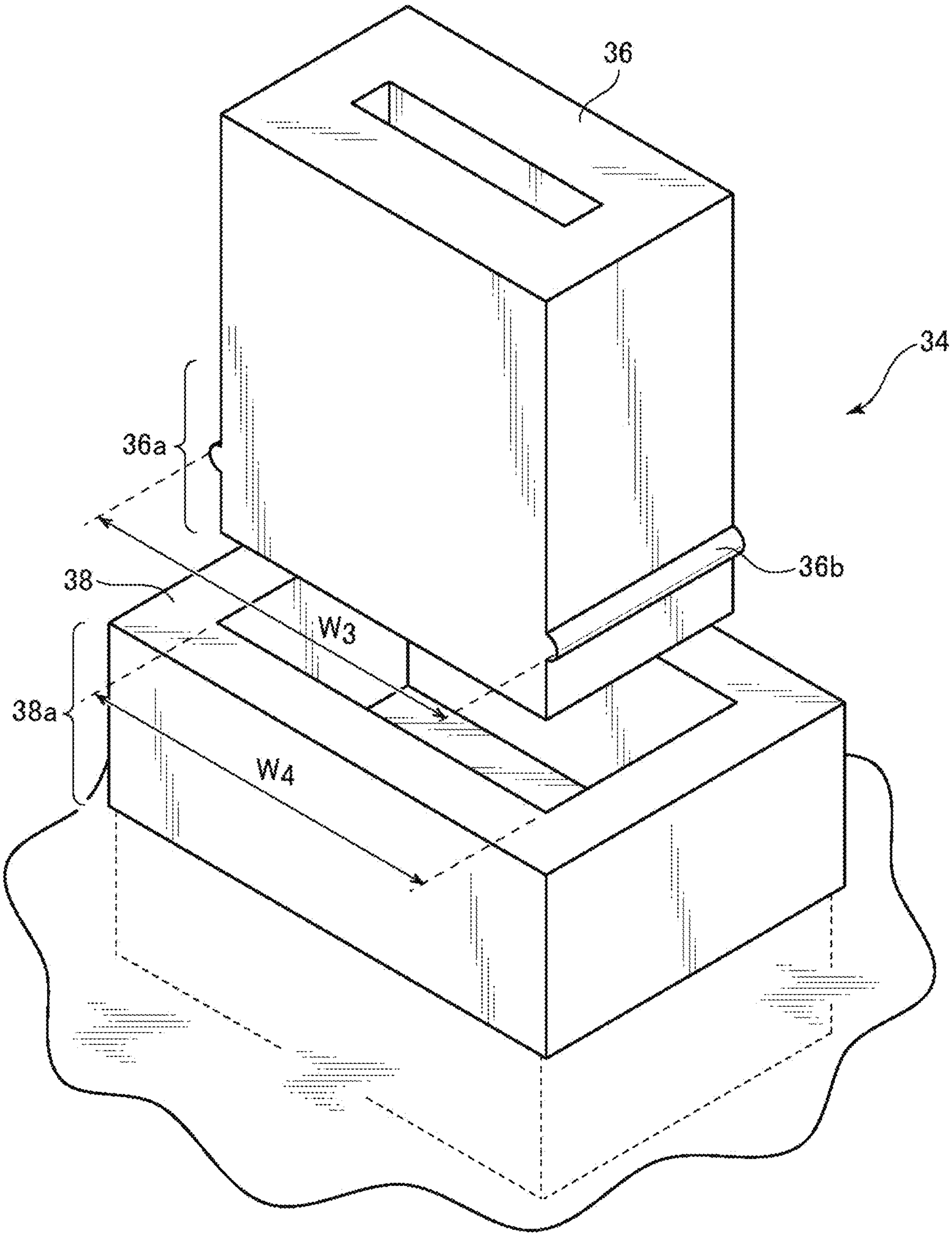
FIG. 11 is a cross-sectional view illustrating a modification of each vibration generating element included in the water discharge device according to the first embodiment of the present invention.

A modification of a vibration generating element included in the water discharge device according to the embodiment of the present invention will be described below with reference to FIG. 11. FIG. 11 is a perspective view illustrating a state in which the vibration generating element according to the modification is disassembled into an upstream member and a downstream member.

As illustrated in FIG. 11, a vibration generating element 34 according to the modification is constituted by an upstream member 36 and a downstream member 38. In the present modification as well, an upstream fitting portion 36*a* at a distal end of the upstream member 36 is fitted into a downstream fitting portion 38*a* at a proximal end of the downstream member 38, and accordingly, the fitting portions are fitted. The structures of a water supply path, a vortex street path, a discharge path, and a collision portion (not illustrated) that are formed inside the upstream member 36 and the downstream member 38 are the same as in the first embodiment described above and thus description thereof is omitted.

As illustrated in FIG. 11, in the present modification, vibration reducing portions 36*b* are provided at the upstream fitting portion 36*a* of the upstream member 36. The vibration reducing portions 36*b* are ribbed protrusions formed on outer side surfaces of the upstream member 36, having semicircular sections, and extending in a direction orthogonal to a longitudinal direction (in a direction orthogonal to a direction in which water flows inside the vibration generating element 34). The vibration reducing portions 36*b* are provided at parts downstream of a collision portion (not illustrated) formed inside the upstream member 36. Note that, in the present modification as well, a width $W_3$ between top portions of the respective ribbed protrusions forming the vibration reducing portions 36*b* is larger than a width $W_4$ between inner wall surfaces of the downstream fitting portion 38*a* receiving the upstream member 36. Since the width $W_3$ is larger than the width $W_4$ and the upstream member 36 or the downstream member 38 is elastically deformed by a predetermined amount when the members are fitted to each other, the upstream member 36 is solidly fixed so that vibration of the upstream member 36 attributable to aeolian tone can be reduced.

Note that, in the present modification, the vibration reducing portions 36*b* are provided on the respective side surfaces of the upstream fitting portion 36*a* of the upstream member 36, but vibration reducing portions (not illustrated) may be provided on a front surface and a back surface (two outer surfaces of the upstream member 36, which are parallel to the vibration plane) of the upstream fitting portion 36*a*. In this case, the vibration reducing portions 36*b* provided on the respective side surfaces of the upstream member 36 may be continuously provided with the vibration reducing portions (not illustrated) provided on the front and back surfaces of the upstream member 36 such that the vibration reducing portions are continuously provided around the entire outer peripheral surface of the upstream member 36.

In a case in which vibration reducing portions (not illustrated) are provided on the front and back surfaces of the upstream fitting portion 36*a* as described above, the vibration reducing portions are pressed against the inner wall surfaces of the downstream fitting portion 38*a*, which are provided facing the respective vibration reducing portions, and elastically deform the inner wall surfaces in the direction orthogonal to the vibration plane. Moreover, frictional force acts between each vibration reducing portion (not illustrated) provided on the front or back surface of the upstream fitting portion 36*a* and the inner wall surface of the downstream fitting portion 38*a*, which is provided facing the vibration reducing portion. The frictional force acts in the direction parallel to the vibration plane and thus can reduce vibration of the upstream member 36 in the direction parallel to the vibration plane, which is attributable to the aeolian tone.

Furthermore, in each of the above-described first embodiment and modification, the vibration reducing portions are formed by bulging parts of the upstream fitting portion in rib shapes, but the side surfaces of the upstream fitting portion may be entirely formed as vibration reducing portions instead of being partially bulged. In this case, the width between the side surfaces of the upstream fitting portion is set to be larger than the width between the corresponding inner wall surfaces of the downstream fitting portion, and the upstream member and the downstream member are formed so that the upstream fitting portion or the downstream fitting portion is elastically deformed by a predetermined amount when the upstream fitting portion and the downstream fitting portion are fitted to each other.

In the water discharge device 1 according to the first embodiment of the present invention, each upstream member 18 is provided with the vibration reducing portions 18*b* that reduce vibration of the upstream member 18 due to vortices generated in the vortex street path 26, and the vibration reducing portions 18*b* elastically deform the downstream fitting portion 20*a* formed of the soft material by a predetermined amount when the upstream fitting portion 18*a* and the downstream fitting portion 20*a* are fitted to each other. Accordingly, the upstream member 18 is solidly fixed to the downstream member 20 so that when the aeolian tone is generated inside the upstream member 18, vibration of the upstream member 18 attributable to the aeolian tone can be reduced and generation of abnormal noise can be sufficiently reduced. Moreover, in the water discharge device 1 according to the present embodiment, since the downstream fitting portion 20*a* is formed of the soft material and the upstream fitting portion 18*a* is formed of the hard material, vibration of the upstream member 18 can be attenuated by the viscosity of the soft material and generation of abnormal noise can be sufficiently reduced.

In the water discharge device 1 according to the present embodiment, since the vibration reducing portions 18*b* are provided at parts downstream of the collision portion 30, the upstream member 18 can be stronger fixed at sites where the aeolian tone is generated, and abnormal noise attributable to the aeolian tone can be more effectively reduced.

In the water discharge device 1 according to the present embodiment, since the vibration reducing portions 18*b* elastically deform the downstream fitting portion 20*a* in the direction parallel to the vibration plane, motion of the upstream member 18 in the direction parallel to the vibration plane can be more strongly reduced, and generation of abnormal noise can be effectively reduced.

In the water discharge device 1 according to the present embodiment, since the downstream members 20 of the plurality of vibration generating elements 22 are integrated with one another to increase the stiffness of the downstream members 20, and the upstream members 18 of the plurality of vibration generating elements 22 are separated from one another, vibration of the plurality of upstream members 18 can be prevented from reinforcing each other through resonance, and generation of abnormal noise can be reliably reduced.

A showerhead that is a water discharge device according to a second embodiment of the present invention will be described below with reference to FIGS. 12 to 15. The water discharge device according to the present embodiment is different from that described above in the first embodiment in that a water discharge device body has a cylindrical shape and each built-in vibration generating element includes a bypass path. Thus, in the following, only the differences of the present embodiment from the first embodiment will be described, and description of any same configurations and effects will be omitted.

Figure 12:
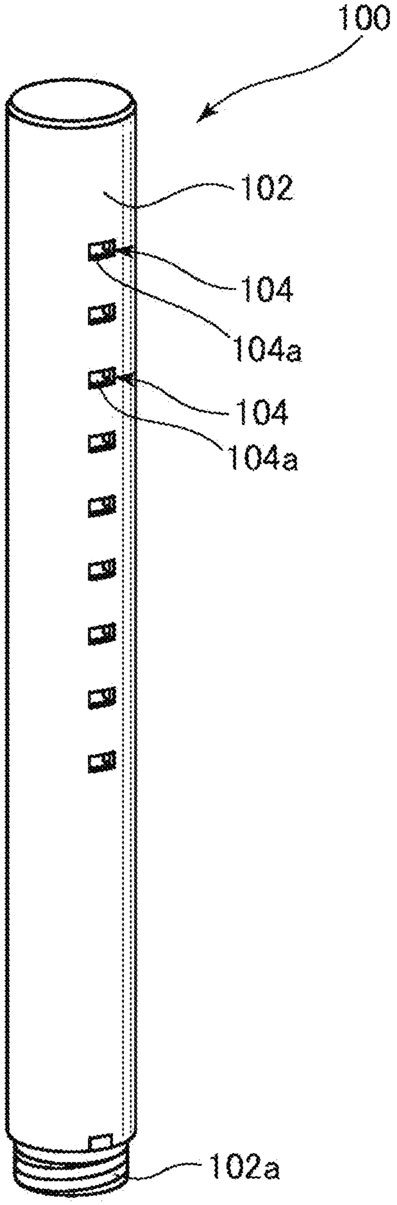
FIG. 12 is a perspective view illustrating the appearance of a showerhead according to a second embodiment of the present invention.
Figure 13:
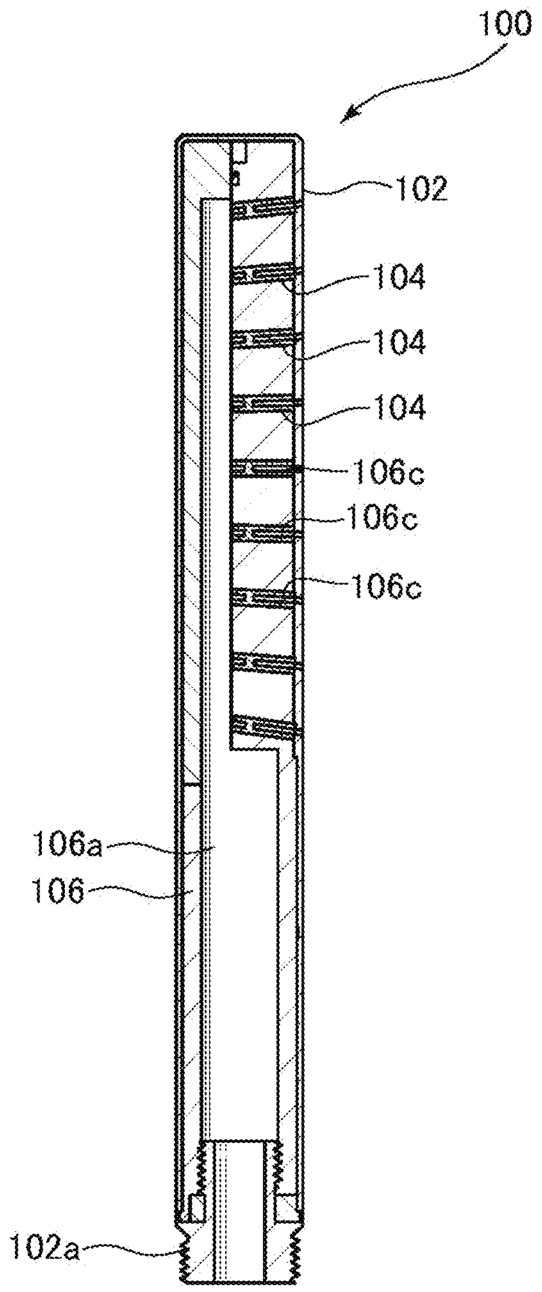
FIG. 13 is a cross-sectional view of the entire showerhead according to the second embodiment of the present invention.
Figure 14:
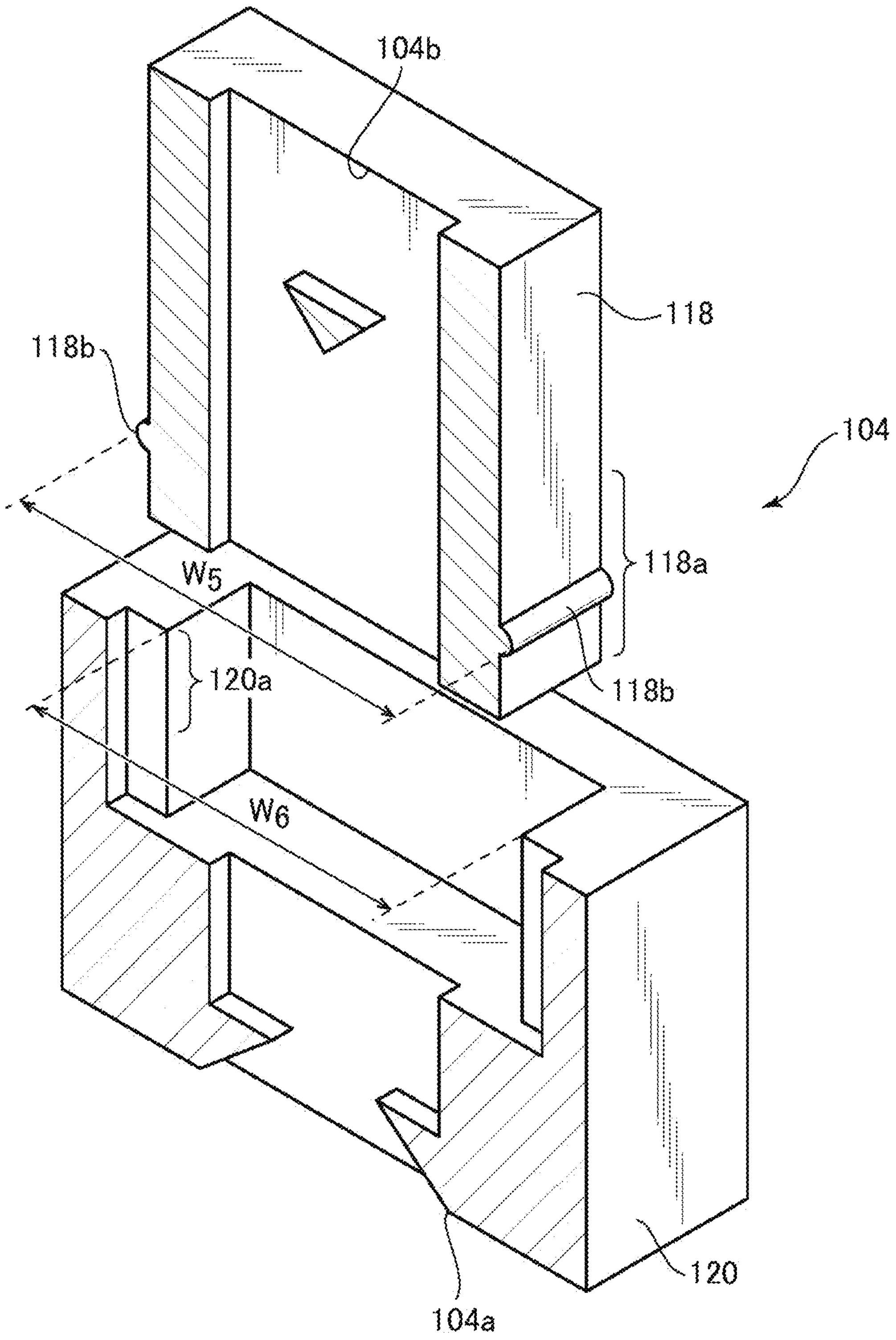
FIG. 14 is a perspective cross-sectional view of each vibration generating element included in the showerhead according to the second embodiment of the present invention.
Figure 15:
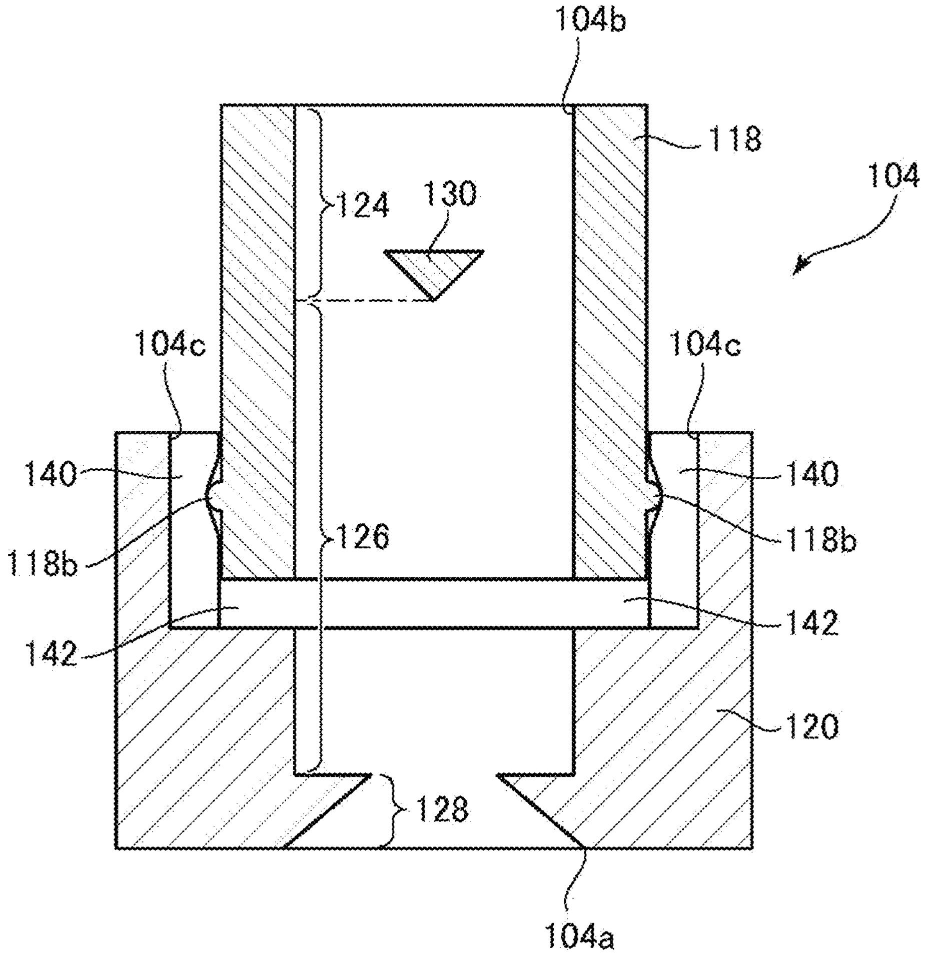
FIG. 15 is a cross-sectional view of the vibration generating element included in the showerhead according to the second embodiment of the present invention when cut in a direction parallel to a vibration plane.

FIG. 12 is a perspective view illustrating the appearance of the showerhead according to the second embodiment of the present invention. FIG. 13 is a cross-sectional view of the entire showerhead according to the second embodiment of the present invention. FIG. 14 is a perspective cross-sectional view of each vibration generating element included in the showerhead according to the second embodiment of the present invention. FIG. 15 is a cross-sectional view of the vibration generating element when cut in the direction parallel to the vibration plane.

As illustrated in FIG. 12, a showerhead 100 according to the present embodiment includes a showerhead body 102 that is a substantially cylindrical water discharge device body, and nine vibration generating elements 104 embedded alongside in line in an axial direction in the showerhead body 102. When water is supplied to the showerhead 100 according to the present embodiment from a shower hose (not illustrated) connected to a proximal end portion 102*a* of the showerhead body 102, the water is discharged from water discharge ports 104*a* of the respective vibration generating elements 104 while being reciprocally vibrated.

The internal structure of the showerhead 100 will be described below with reference to FIG. 13. As illustrated in FIG. 13, a cold water passage forming member 106 that forms a cold water passage and holds the vibration generating elements 104 is built in the showerhead body 102. The cold water passage forming member 106 is a substantially cylindrical member and forms a flow passage of water supplied inside the showerhead body 102. The shower hose (not illustrated) is connected in a watertight manner to a proximal end portion of the cold water passage forming member 106. A main cold water passage 106*a* extending substantially in the axial direction is formed inside the cold water passage forming member 106.

In addition, in the cold water passage forming member 106, nine element insertion holes 106*c* in which the respective vibration generating elements 104 are inserted and held are formed to communicate with the main cold water passage 106*a*. The element insertion holes 106*c* are formed from an outer peripheral surface of the cold water passage forming member 106 to the main cold water passage 106*a*. The element insertion holes 106*c* are formed alongside in line in the axial direction at substantially equal intervals. With this configuration, water having flowed into the main cold water passage 106*a* of the cold water passage forming member 106 flows into each vibration generating element 104 held by the cold water passage forming member 106 from the back side of the vibration generating element 104 and is discharged from the corresponding water discharge port 104*a* provided on the front side of the vibration generating element 104.

The configuration of each vibration generating element 104 built in the showerhead according to the present embodiment will be described below with reference to FIGS. 14 and 15. Note that FIGS. 14 and 15 are cross-sectional views of the vibration generating element 104 when cut along a plane parallel to the vibration plane, and the vibration generating element 104 is symmetric with respect to the section. As illustrated in FIGS. 14 and 15, the vibration generating element 104 is a rectangular parallelepiped member that is substantially uniformly thin, the water discharge port 104*a* that is rectangular is provided at an end face of the vibration generating element 104 on the front side, a main inflow port 104*b* is formed at the center of an end face of the vibration generating element 104 on the back side, and bypass inflow ports 104*c* are provided on the respective sides of the main inflow port 104*b*. When the vibration generating element 104 is inserted into the element insertion hole 106*c*, the main inflow port 104*b* and the bypass inflow ports 104*c* communicate with the main cold water passage 106*a* of the cold water passage forming member 106.

Each vibration generating element 104 is constituted by two members of an upstream member 118 and a downstream member 120, and an upstream fitting portion 118*a* of the upstream member 118 is inserted into a downstream fitting portion 120*a* of the downstream member 120 from the back side. With this configuration, a second water supply path 140 (FIG. 15) is formed between each side surface of the upstream member 118 and the corresponding inner wall surface of the downstream member 120. Note that, in the present embodiment as well, the downstream member 120 is formed of a soft material, and the upstream member 118 is formed of a hard material having an elastic modulus larger than the elastic modulus of the soft material.

As illustrated in FIG. 15, a water supply path 124, a vortex street path 126, and a discharge path 128 are formed in order from the upstream side inside each vibration generating element 104. In addition, a collision portion 130 is provided at a downstream end portion of the water supply path 124. The water supply path 124 and the upstream side of the vortex street path 126 are formed inside the upstream member 118, and the downstream side of the vortex street path 126 and the discharge path 128 are formed inside the downstream member 120.

The water supply path 124 is a straight path having a rectangular section with a constant cross-sectional area and extending from the main inflow port 104*b* on the back side of the vibration generating element 104.

The vortex street path 126 is a path having a rectangular section and continuously provided with the water supply path 124 downstream of the water supply path 124. Specifically, in the present embodiment, the water supply path 124 and the upstream side of the vortex street path 126, which are provided inside the upstream member 118, extend in line with identical sectional shapes. The downstream side of the vortex street path 126 is provided inside the downstream member 120.

The discharge path 128 is a path provided on the downstream side to communicate with the vortex street path 126 and has a width that increases toward downstream. The discharge path 128 has a constant height. The flow passage cross-sectional area at an upstream end of the discharge path 128 is smaller than the flow passage cross-sectional area of the vortex street path 126, and water flow including vortex streets guided through the vortex street path 126 is narrowed and discharged from the water discharge port 104*a*.

Bypass paths 142 (FIG. 15) each having a rectangular section are provided facing each other at respective side surfaces of the vortex street path 126. Water having flowed in from each second water supply path 140 passes through the corresponding bypass path 142 and flows from the corresponding side surface of the vortex street path 126 into the vortex street path 126 on the downstream side of the collision portion 130. Each bypass path 142 is provided at a part where the corresponding upstream member 118 and downstream member 120 are connected. Specifically, part of the inner wall surface forming the bypass path 142 is provided in the downstream member 120, and the remaining part is provided in the upstream member 118. Accordingly, a mold (not illustrated) for molding each bypass path 142 does not need to have a configuration with which the mold is removed in the direction of the bypass path 142 (toward a side), and the vibration generating element 104 including the bypass paths 142 can be easily molded.

The collision portion 130 formed at a downstream end of the water supply path 124 is provided to block part of a flow passage section of the water supply path 124. The collision portion 130 is a triangular prism part extending to couple facing wall surfaces (ceiling surface and floor surface) of the water supply path 124 in the height direction and disposed as an island at the center of the water supply path 124 in the width direction. The collision portion 130 has a section formed in an isosceles right triangle shape and is disposed such that the hypotenuse is orthogonal to a center axis line of the water supply path 124 and the right angle of the isosceles right triangle is positioned on the downstream side.

As illustrated in FIG. 14, vibration reducing portions 118*b* are provided on respective side surfaces of the upstream member 118. The vibration reducing portions 118*b* are ribbed protrusions having semicircular sections and extending in a direction orthogonal to a longitudinal direction of the upstream member 118 (direction in which hot/cold water flows inside the vibration generating element 104). Note that, in the present embodiment, the vibration reducing portions 118*b* are provided across the side surfaces of the upstream member 118, but as a modification, the vibration reducing portions 118*b* may be not provided at parts facing the second water supply paths 140.

The upstream fitting portion 118*a* at a distal end of the upstream member 118 where the vibration reducing portions 118*b* are formed is inserted into the downstream fitting portion 120*a* of the downstream member 120, and the upstream member 118 and the downstream member 120 are fitted to each other. A width $W_5$ between top portions of the vibration reducing portions 118*b* provided at the upstream fitting portion 118*a* is larger than a width $W_6$ between inner wall surfaces of the downstream fitting portion 120*a* receiving the upstream fitting portion 118*a*. With this configuration, as illustrated in FIG. 15, when the upstream member 118 and the downstream member 120 are fitted to each other, the downstream fitting portion 120*a* of the downstream member 120 formed of the soft material is mainly elastically deformed by a predetermined amount in the direction parallel to the vibration plane. Accordingly, the upstream member 118 is solidly fixed by the downstream member 120.

In each vibration generating element 104 included in the present embodiment as well, since the collision portion 130 is provided, Karman vortices are generated downstream of the collision portion 130, and water discharged from the water discharge port 104*a* is reciprocally vibrated. When aeolian tone is generated in the vibration generating element 104 due to the Karman vortices, vibration of the upstream member 118 attributable to the aeolian tone can be sufficiently reduced since the upstream member 118 is solidly fixed by the downstream member 120.

As described above, the bypass paths 142 are provided facing each other on the side surfaces of the vortex street path 126, and water having passed through the bypass paths 142 from the second water supply paths 140 flows into the vortex street path 126. Accordingly, the bypass paths 142 generate water inflow in a direction orthogonal to a direction in which the vortex street path 126 extends.

Hot/cold water from the bypass paths 142 joins flow including Karman vortices formed by the collision portion 130 from sides. In other words, water having flowed in through the bypass paths 142 flows into the vortex street path 126 by bypassing the collision portion 130.

In this manner, in the vortex street path 126, water from each bypass path 142 joins flow including Karman vortices formed by the collision portion 130, and thus change of the flow speed at the water discharge port 104*a* along with the progress of vortex streets is small. Accordingly, deflection of discharged water is small, and the vibration amplitude of sprayed water is small. Thus, the vibration amplitude of water can be freely designed by setting, as appropriate, the ratio of the flow rate of water flowing into the vortex street path 126 through the collision portion 130 and the flow rate of water flowing in from the bypass paths 142.

In the water discharge device according to the second embodiment of the present invention, since each vibration generating element 104 includes the bypass paths 142 (FIG. 15), for example, the amplitude of reciprocal vibration of water discharged from the vibration generating element 104 can be adjusted also by the flow rate of water flowing in from the bypass paths 142. Moreover, since part of the inner wall surface of each bypass path 142 is formed by the downstream member 120, the vibration generating element 104 including the bypass paths 142 can be easily molded.

Figure 16:
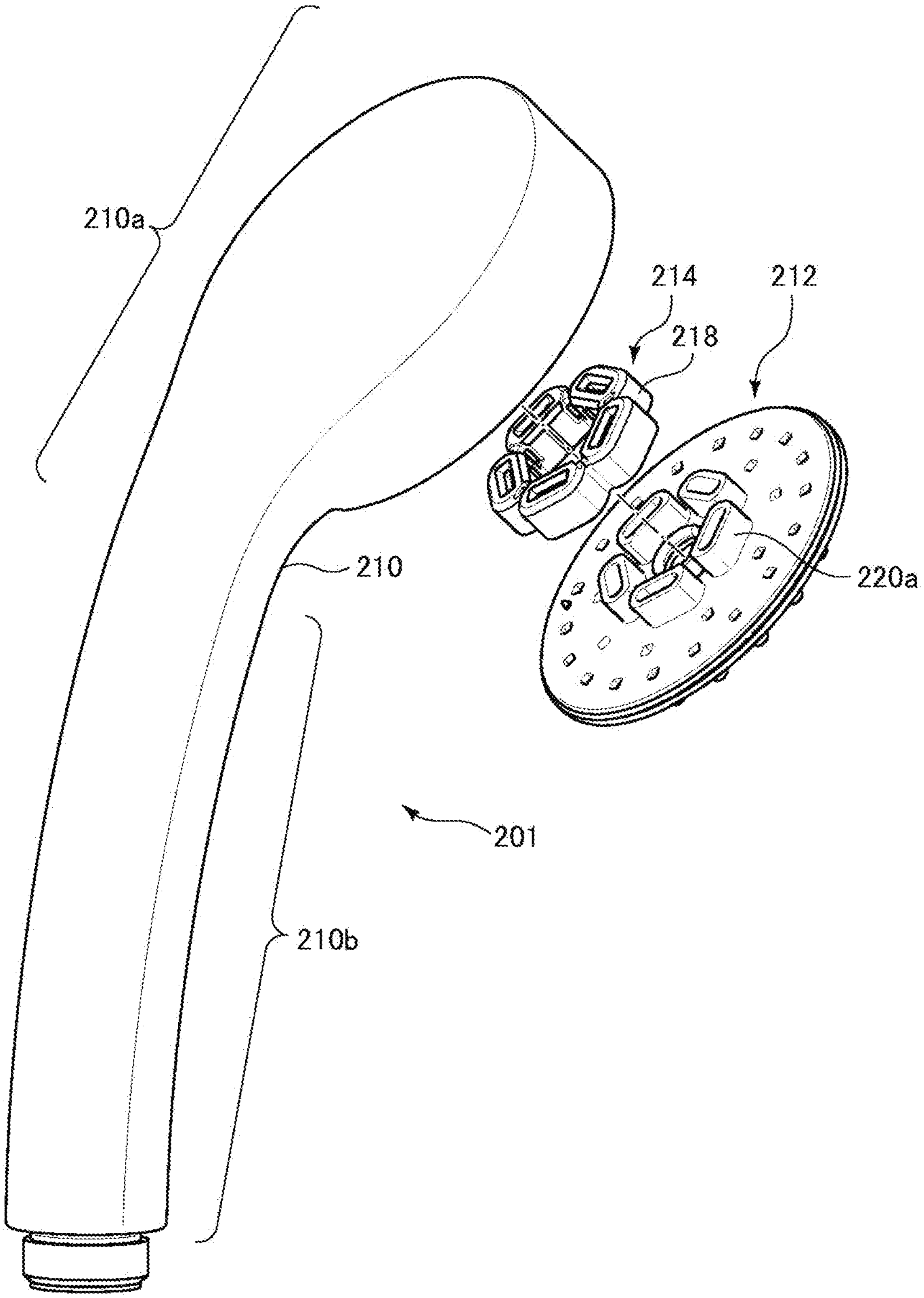
FIG. 16 is an exploded perspective view of a water discharge device according to a third embodiment of the present invention when viewed from above.
Figure 17:
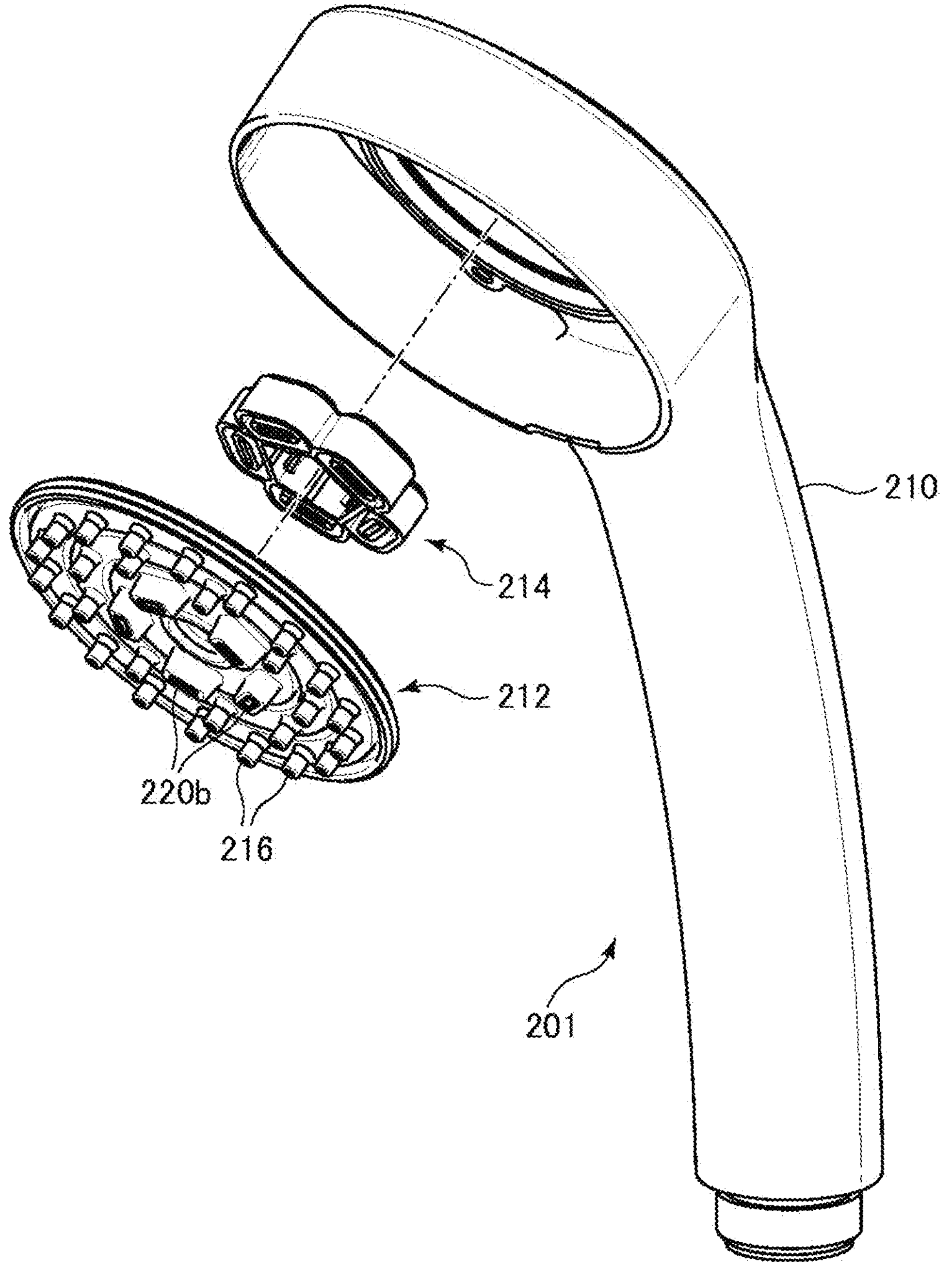
FIG. 17 is an exploded perspective view of the water discharge device according to the third embodiment of the present invention when viewed from below.

A water discharge device according to a third embodiment of the present invention will be described below. FIG. 16 is an exploded perspective view of the water discharge device according to the third embodiment of the present invention when viewed from above. FIG. 17 is an exploded perspective view of the water discharge device according to the third embodiment of the present invention when viewed from below.

As illustrated in FIGS. 16 and 17, a water discharge device 201 according to the present embodiment is what is called a hand shower and includes a water discharge device body 210, a water spray plate 212 attached to the water discharge device body 210, and a functional member 214 attached to a back surface of the water spray plate 212.

The water discharge device body 210 includes a water discharge head unit 210*a* and a grasping unit 210*b* and is formed such that supplied water flows inside. The water spray plate 212 is a member having a substantially circular disk shape and attached to the water discharge head unit 210*a* of the water discharge device body 210. As illustrated in FIG. 17, a plurality of cylindrical water spray nozzles 216 are provided as protrusions on a front surface of the water spray plate 212.

As illustrated in FIG. 16, the functional member 214 is attached to the center on the back surface side of the water spray plate 212 and constitutes five vibration generating elements together with part of the water spray plate 212. Each vibration generating element discharges supplied water while reciprocally vibrating the water in a predetermined vibration plane. Details of the vibration generating elements will be described later.

The water discharge device 201 according to the present embodiment has a configuration in which supplied water flows into the water discharge device body 210 and is discharged as shower through the water spray nozzles 216 of the water spray plate 212 attached to the water discharge head unit 210*a* and the vibration generating elements. Water discharged from each water spray nozzle 216 is discharged in one line, and water discharged from each vibration generating element is discharged while being reciprocally vibrated in the predetermined vibration plane.

Figure 18:
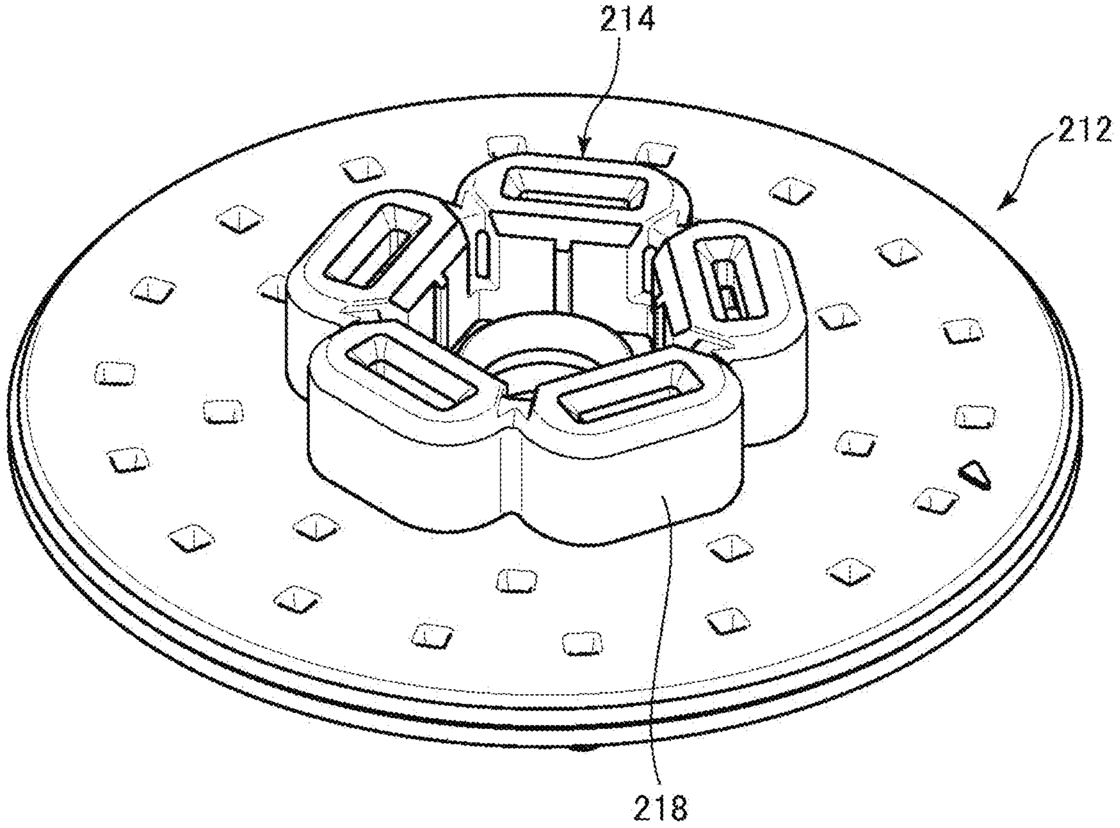
FIG. 18 is a perspective view illustrating a state in which each functional member is attached to a water spray plate in the water discharge device according to the third embodiment of the present invention.
Figure 19:
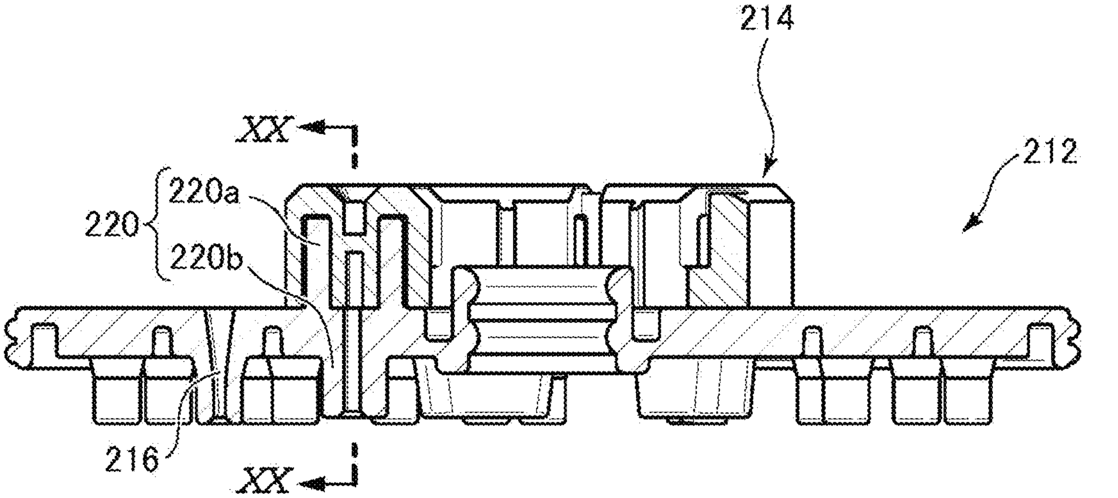
FIG. 19 is a cross-sectional view of a state in which each functional member is attached to the water spray plate in the water discharge device according to the third embodiment of the present invention.
Figure 20:
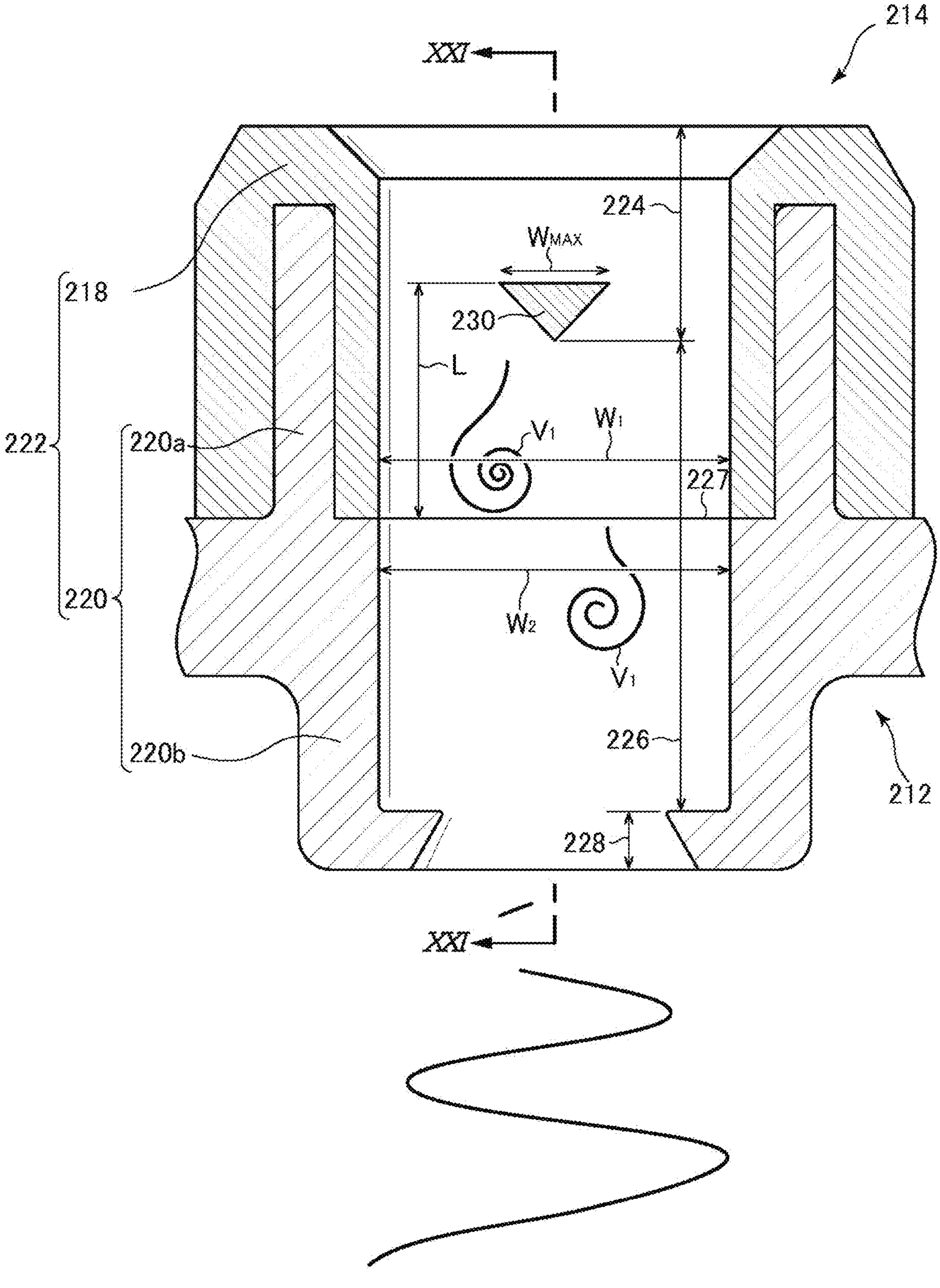
FIG. 20 is a cross-sectional view along line V-V in FIG. 19, only illustrating one vibration generating element.
Figure 21:
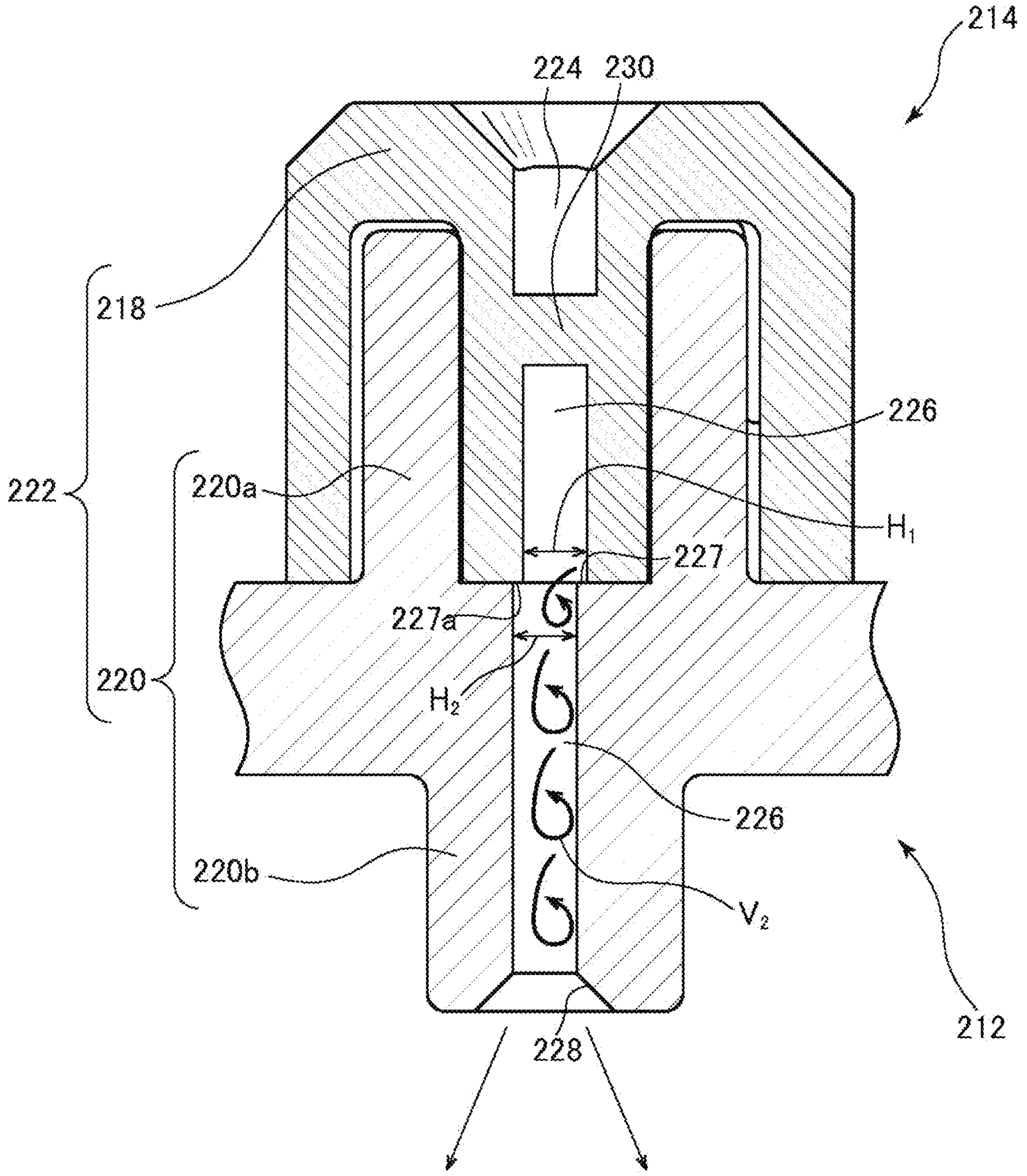
FIG. 21 is a cross-sectional view along line VI-VI in FIG. 20.
Figure 22:
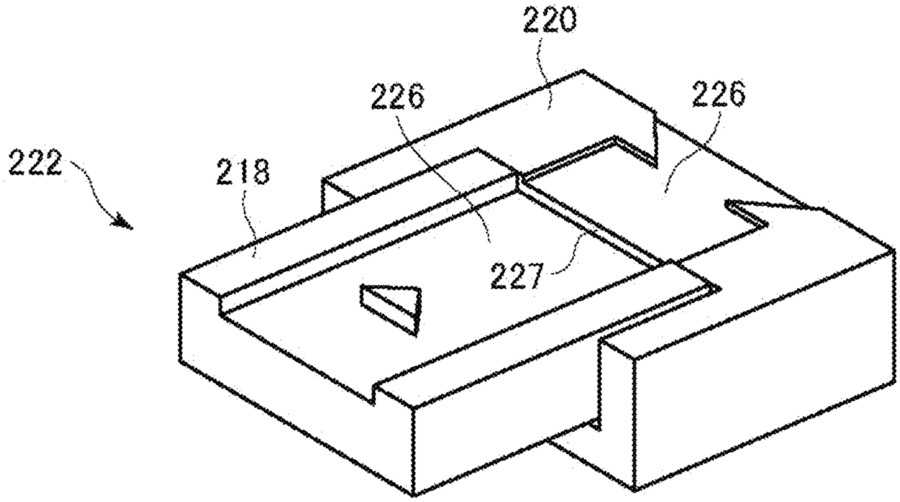
FIG. 22 is a perspective cross-sectional view of each vibration generating element in the water discharge device according to the third embodiment of the present invention when cut in a direction parallel to the vibration plane.

Each vibration generating element will be described below with reference to FIGS. 18 to 22 in addition. FIG. 18 is a perspective view illustrating a state in which the functional member 214 is attached to the water spray plate 212, and FIG. 19 is a cross-sectional view of the state. FIG. 20 is a cross-sectional view along line V-V in FIG. 19, only illustrating one vibration generating element. FIG. 21 is a cross-sectional view along line VI-VI in FIG. 20. FIG. 22 is a perspective cross-sectional view of each vibration generating element when cut in a direction parallel to the vibration plane.

Each vibration generating element 222 is formed by connecting an upstream member 218 and a downstream member 220 (FIG. 20). Specifically, in the present embodiment, the five upstream members 218 are coupled to each other in an annular shape, thereby constituting the above-described functional member 214 as illustrated in FIG. 18. In the present embodiment, the downstream member 220 is formed integrally with the water spray plate 212 as illustrated in FIG. 19, and part of the water spray plate 212 functions as the downstream member 220.

Specifically, as illustrated in FIG. 19, each downstream member 220 is constituted by a back surface portion 220*a* (FIG. 16) formed as a protrusion on the back surface side of the water spray plate 212, and a front surface portion 220*b* (FIG. 17) formed as a protrusion on the front surface side of the water spray plate 212. Accordingly, in the present embodiment, the functional member 214 is attached to the back surface side of the water spray plate 212, thereby constituting the five vibration generating elements 222 arrayed in an annular shape. In the present embodiment, the functional member 214 (upstream members 218) is formed of a hard member (for example, polyacetal (POM)), and the water spray plate 212 (downstream members 220) is formed of a soft member (for example, thermoplastic elastomer (TPE)). Note that, in the present embodiment, the functional member 214 is fitted to the water spray plate 212, and accordingly, both members are connected to each other, but the upstream members 218 and the downstream members 220 may be connected by an optional method such as bonding or welding. Note that the hard member may be any member having such a strength that the member does not deform under normal water supply pressure, and may be, for example, ABS resin (acrylonitrile-butadiene-styrene copolymer). The soft member only needs to be a member that can be easily elastically deformed when a user applies force thereto, and may be, for example, silicone rubber.

As illustrated in FIG. 20, each vibration generating element 222 includes a water supply path 224 into which supplied water flows, a vortex street path 226 provided downstream of the water supply path 224, and a discharge path 228 through which water guided through the vortex street path is discharged. A collision portion 230 is provided at a downstream end portion of the water supply path 224 to block part of a flow passage section of the water supply path 224. A flow diffusion portion 227 is provided halfway through the vortex street path 226. Each vibration generating element 222 discharges supplied water from a downstream end of the discharge path 228 while reciprocally vibrating the water in a vibration plane parallel to the sheet of FIG. 20.

As described above, each vibration generating element 222 is constituted by two members of an upstream member 218 and a downstream member 220, and a water supply path 224 and an upstream part of a vortex street path 226 are formed in the upstream member 218. In addition, a downstream part of the vortex street path 226 and a discharge path 228 are formed in the downstream member 220. In other words, the upstream side of the vortex street path 226 is formed in the upstream member 218, the downstream side of the vortex street path 226 is formed in the downstream member 220, and the vortex street path 226 is formed by connecting the upstream member 218 and the downstream member 220. In addition, the flow diffusion portion 227 provided halfway through the vortex street path 226 is formed at a part where the upstream member 218 and the downstream member 220 are connected.

The water supply path 224 is a path that has a section with a constant dimension and a constant shape and into which water having flowed into the water discharge device body 210 flows. The water supply path 224 is formed with a flat rectangular section having a width in a direction parallel to the vibration plane and a height in a direction orthogonal to the vibration plane, the width being larger than the height. The water supply path 224 is continuously provided with the vortex street path 226 formed downstream in the same sectional shape.

The collision portion 230 is provided at the downstream end portion of the water supply path 224 to block part of the flow passage section of the water supply path 224. Specifically, the collision portion 230 is provided to couple two inner wall surfaces parallel to the vibration plane and forming the water supply path 224 and the vortex street path 226 (FIG. 21). In the present embodiment, the collision portion 230 is formed in an isosceles right triangle shape when viewed in the direction orthogonal to the vibration plane (FIG. 20), and is disposed at the center of the water supply path 224 such that the hypotenuse is positioned on the upstream side. When water guided through the water supply path 224 collides with the collision portion 230, vortex streets $V_1$ in mutually opposite directions are generated downstream of the collision portion 230 in a plane parallel to the vibration plane.

The vortex street path 226 is formed downstream of the water supply path 224 to guide vortices formed by the collision portion 230. The vortex street path 226 is a path formed continuously with the water supply path 224 at an upstream part having the same sectional dimension and shape as the water supply path 224. Specifically, the vortex street path 226 is a path having a flat rectangular section and formed with a width in the direction parallel to the vibration plane and a height in the direction orthogonal to the vibration plane, the width being larger than the height. Vortices formed by the collision portion 230 move toward downstream while being guided and grown through the vortex street path 226.

The discharge path 228 is a flow passage connected downstream of the vortex street path 226 and discharges water guided through the vortex street path 226. The width of an upstream end of the discharge path 228 in the direction parallel to the vibration plane is smaller than the width of a downstream end of the vortex street path 226 and larger in a tapering manner toward downstream. As illustrated in FIG. 21, the height of the upstream end of the discharge path 228 in the direction orthogonal to the vibration plane is equal to the height of the downstream end of the vortex street path 226 and larger in a tapering manner toward downstream. Accordingly, the discharge path 228 has a height equal to or larger than a minimum height of the vortex street path 226. Vortices generated in mutually opposite directions downstream of the collision portion 230 are grown through the vortex street path 226 and discharged from the discharge path 228. As the vortices in opposite directions alternately reach, the direction of water discharged from the discharge path 228 reciprocally vibrates in the vibration plane. Note that the height of the discharge path 228 in the direction orthogonal to the vibration plane may be constant instead of being larger in a tapering manner toward downstream.

As illustrated in FIGS. 21 and 22, the flow diffusion portion 227 is provided halfway through the vortex street path 226 and constituted by a stepped portion formed to narrow a flow passage toward downstream through the vortex street path 226 in the height direction. The stepped portion extends across the entire vortex street path 226 in a direction orthogonal to water flow in the vortex street path 226 and is provided on one of two inner wall surfaces facing each other in the direction parallel to the vibration plane. In this manner, the "stepped portion" that narrows the flow passage through the vortex street path 226 in the height direction is provided as the flow diffusion portion 227 halfway through the vortex street path 226. Accordingly, part of water flowing inside the vortex street path 226 collides with the "stepped portion", and small vortices $V_2$ (FIG. 21) are generated in a plane orthogonal to the vibration plane in water flow in the vortex street path 226. As a result, the water flow in the vortex street path 226 is moderately diffused in the height direction of the vortex street path 226. Accordingly, the vortices $V_2$ are generated in the direction orthogonal to the vibration plane by the flow diffusion portion 227 in addition to the vortex streets $V_1$ in the vibration plane formed downstream of the collision portion 230, and moderate flow disorder occurs.

Water discharged from the discharge path 228 is moderately diffused also in the direction orthogonal to the vibration plane due to the disorder in the direction orthogonal to the vibration plane. In the present embodiment, the height of the stepped portion constituting the flow diffusion portion 227 is approximately 30% of the height of the vortex street path 226. A stepped portion having a height approximately equal to or larger than 5% and approximately equal to or smaller than 50% of the height of the vortex street path 226 is preferably provided as the flow diffusion portion 227 so that water discharged from the discharge path 228 is moderately diffused also in the direction orthogonal to the vibration plane. In a case in which the flow diffusion portion 227 is a stepped portion having a height approximately larger than 50% of the height of the vortex street path 226, vortices formed downstream of the collision portion 230 are largely broken, and as a result, water discharged from the discharge path 228 does not reciprocally vibrate in the vibration plane or the amplitude of reciprocal vibration is small. With a stepped portion having a height approximately smaller than 5% of the height of the vortex street path 226, water discharged from the discharge path 228 cannot be sufficiently diffused in the direction orthogonal to the vibration plane.

As illustrated in FIG. 21, the height of the vortex street path 226 formed in the downstream member 220 and the height of the vortex street path 226 formed in the upstream member 218 are constant across the total length, and the height $H_2$ of the vortex street path 226 of the downstream member 220 and the height $H_1$ of the vortex street path 226 of the upstream member 218 are equal to each other. Thus, a stepped portion that narrows the flow passage toward downstream in the height direction is formed as the flow diffusion portion 227 on one of the inner wall surfaces of the vortex street path 226 at the part where the upstream member 218 and the downstream member 220 are connected, and a bending portion **227*a* that is bent to expand the flow passage toward downstream in the height direction is formed on the other inner wall surface of the vortex street path 226. Note that the height $H_2$ of the vortex street path 226 formed in the downstream member 220 may be smaller than the height $H_1$ of the vortex street path 226 formed in the upstream member 218. In this case, a stepped portion that narrows the flow passage may be formed as a flow diffusion portion 27 on one of the inner wall surfaces of the vortex street path 26**, and a vortex street path without a step may be formed on the other inner wall surface.

In the present embodiment, as illustrated in FIG. 20, the width $W_2$ of an upstream end of the vortex street path 226 formed in the downstream member 220 is equal to the width $W_1$ of the downstream end of the vortex street path 226 formed in the upstream member 218.

In the present embodiment, a length L from an upstream end of the collision portion 230 to the downstream end of the vortex street path 226 (flow diffusion portion 227) formed in the upstream member 218 is 6.7 mm approximately, and a maximum width WMAX of the collision portion 230 is 2 mm approximately. In a case in which the length L is set to be long in this manner, vortices formed by the collision portion 230 sufficiently grow before reaching the flow diffusion portion 227 of the vortex street path 226. Accordingly, collapse of vortices formed in the vibration plane by the collision portion 230 is reduced even when flow is diffused in the direction orthogonal to the vibration plane at the flow diffusion portion 227. The length L from the upstream end of the collision portion 230 to the flow diffusion portion 227 formed in the vortex street path 226 is preferably more than 2.0 times larger than the maximum width WMAx of the collision portion 230.

Figure 23:
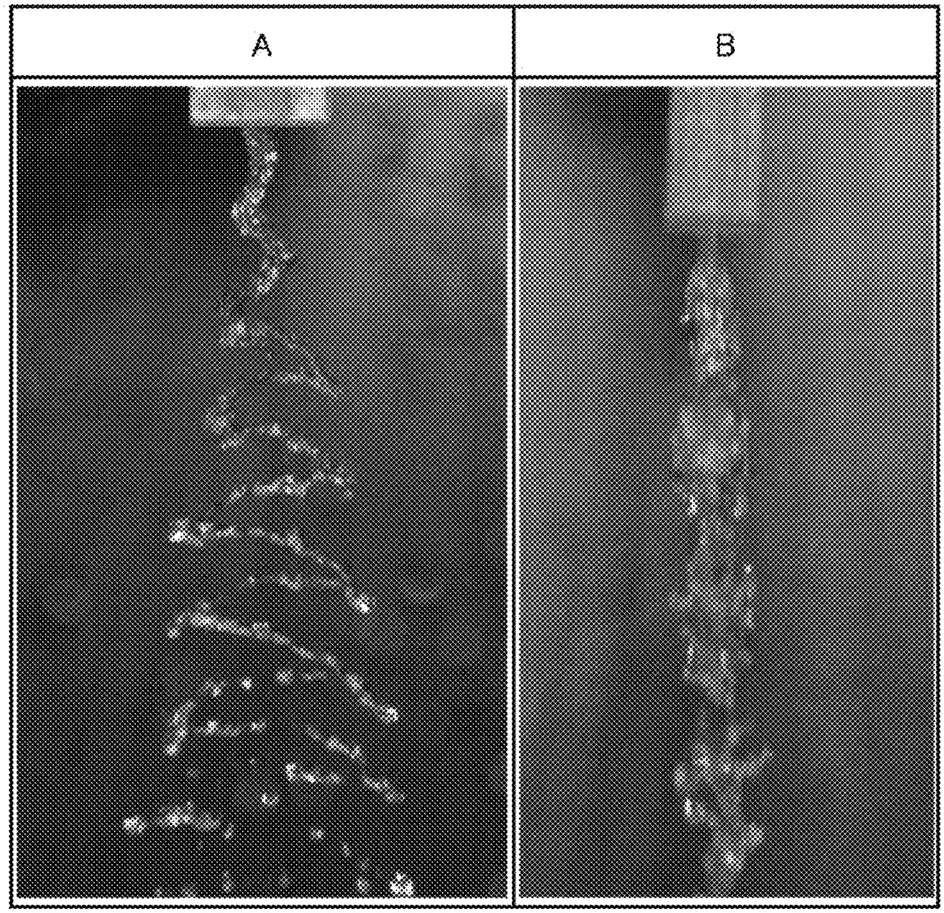
FIG. 23 is a diagram illustrating a state of water discharged from a vibration generating element included in the water discharge device of the present embodiment.
Figure 24:
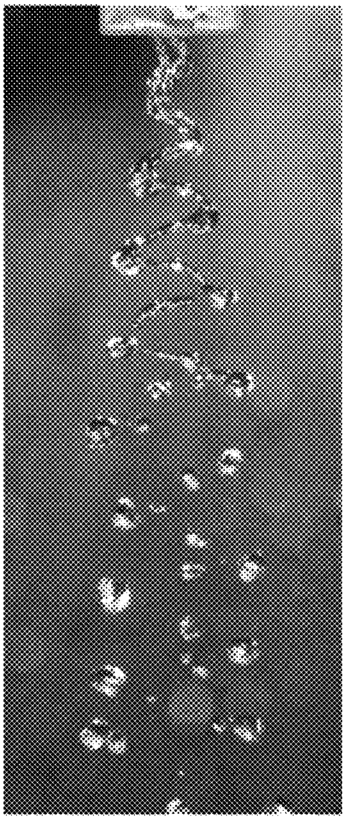
FIG. 24 is a diagram illustrating a state of water discharged from a vibration generating element according to a comparative example in which no flow diffusion portion is provided.
Figure 24:
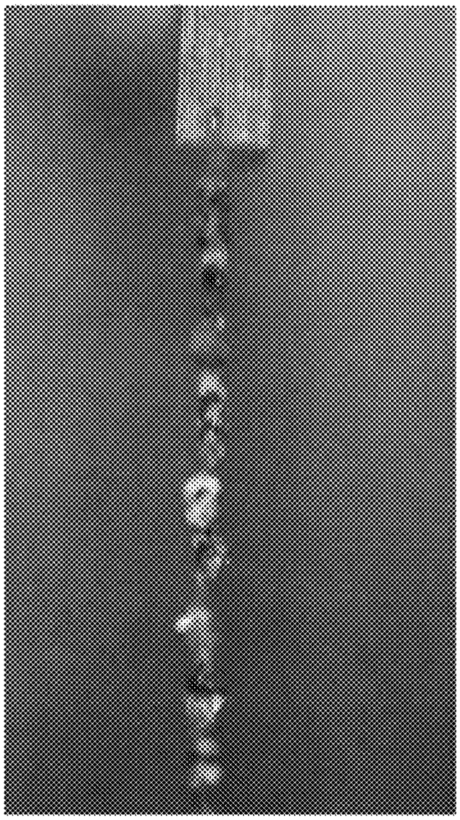
Figure 25:
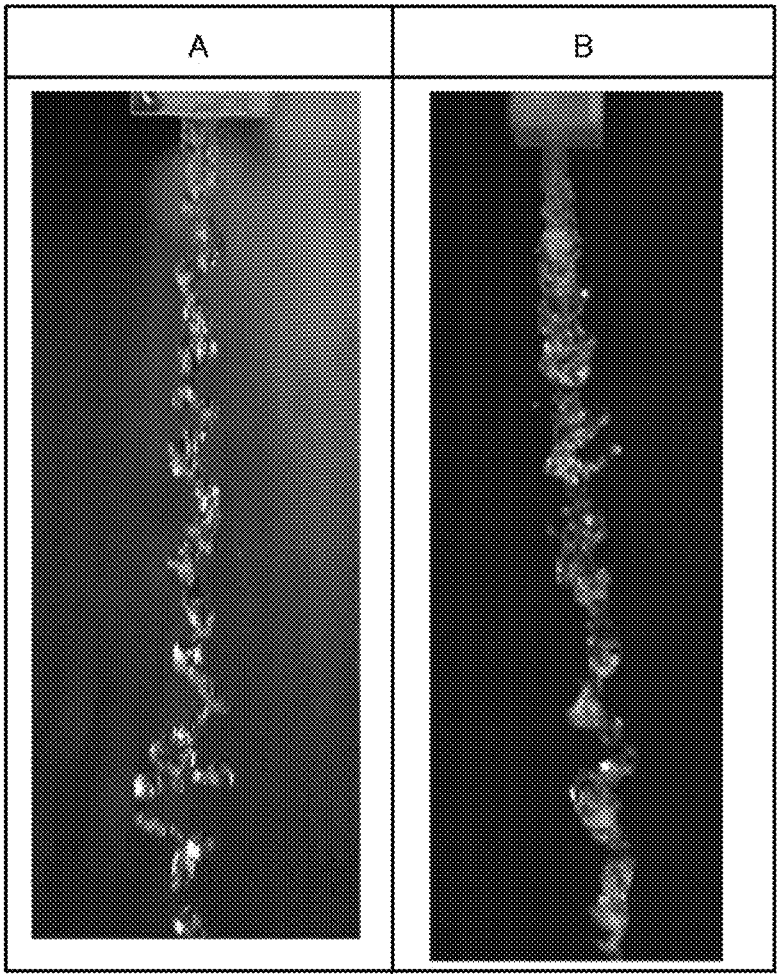
FIG. 25 is a diagram illustrating a state of water discharged from a vibration generating element according to a comparative example in which the height of a stepped portion of a flow diffusion portion is set to be 60% of the height of a vortex street path.

Effects of each vibration generating element included in the water discharge device according to the embodiment of the present invention will be described below with reference to FIGS. 23 to 25. FIG. 23 is a diagram illustrating the state of water discharged from a vibration generating element included in the water discharge device according to the present embodiment, the column A illustrates a picture obtained by capturing discharged water in the direction orthogonal to the vibration plane, and the column B is a picture obtained by capturing discharged water in the direction parallel to the vibration plane. FIG. 24 is a diagram illustrating the state of water discharged from a vibration generating element according to a comparative example in which no flow diffusion portion 227 is provided. FIG. 25 is a diagram illustrating the state of water discharged from a vibration generating element according to a comparative example in which the height of the stepped portion of the flow diffusion portion 27 is 60% of the height of the vortex street path. Note that, in FIGS. 24 and 25 as well, the column A illustrates a picture obtained by image capturing in the direction orthogonal to the vibration plane, and the column B illustrates a picture obtained by image capturing in the direction parallel to the vibration plane.

The vibration generating element 222 included in the water discharge device 201 according to the embodiment of the present invention and illustrated in FIG. 23 is provided with the flow diffusion portion 227 constituted by a stepped portion having a height equal to 30% of the height of the vortex street path 226 as described above. As illustrated in the column A of FIG. 23, water discharged from the vibration generating element 222 in the present embodiment is sinusoidally reciprocally vibrated in the vibration plane. Accordingly, water discharged from the vibration generating element 222 has a landing range that is large in the direction parallel to the vibration plane. As illustrated in the column B of FIG. 23, water discharged from the vibration generating element 222 is diffused also in the direction orthogonal to the vibration plane and has a landing range that is relatively large also in the direction orthogonal to the vibration plane. Thus, with the vibration generating element 222 in the present embodiment, a relatively large landing area can be ensured.

However, as illustrated in FIG. 24, water discharged from the vibration generating element according to the comparative example in which no flow diffusion portion 227 is provided is sinusoidally reciprocally vibrated in the vibration plane (the column A of FIG. 24), but discharged water is hardly expanded in the direction orthogonal to the vibration plane (the column B of FIG. 24). In this manner, with the vibration generating element according to the comparative example in which no flow diffusion portion 227 is provided and that is illustrated in FIG. 24, discharged water is not diffused in the direction orthogonal to the vibration plane and has a small landing range in the direction orthogonal to the vibration plane. Thus, with the vibration generating element in which no flow diffusion portion 227 is provided, the landing range linearly expands, and thus it is difficult to increase the landing area.

With the vibration generating element according to the comparative example in which the height of the stepped portion of the flow diffusion portion 227 is equal to 60% of the height of the vortex street path, discharged water is diffused in the direction orthogonal to the vibration plane as illustrated in the column B of FIG. 25, but reciprocal vibration in the vibration plane hardly occurs as illustrated in the column A. In this manner, in a case in which the height of the stepped portion constituting the flow diffusion portion 227 exceeds 50% of the height of the vortex street path 226, vortices formed downstream of the collision portion 230 are broken by the flow diffusion portion 227 and reciprocal vibration of discharged water in the vibration plane hardly occurs, and thus it is unable to increase the landing area.

Figure 26:
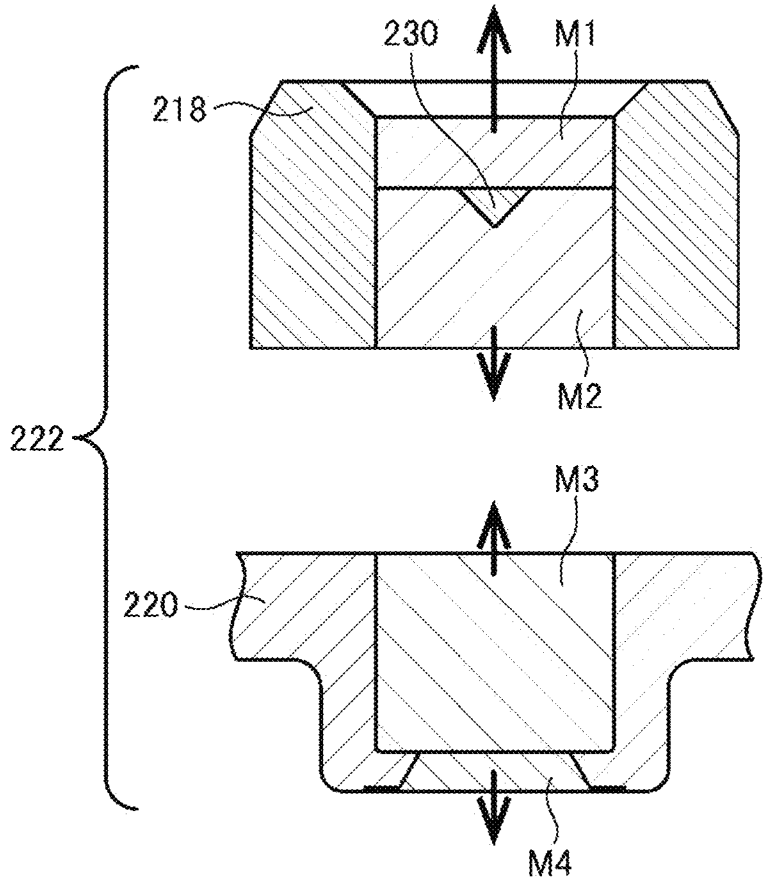
FIG. 26 is a diagram schematically illustrating a vibration generating element constituted by two members in the water discharge device according to the third embodiment of the present invention.

A manufacturing advantage of constituting each vibration generating element 22 with two members will be described below with reference to FIGS. 26 and 27. FIG. 26 is a diagram schematically illustrating the vibration generating element constituted by two members in the present embodiment, and FIG. 27 is a diagram schematically illustrating an integrated vibration generating element.

As illustrated in FIG. 26, the vibration generating element 222 according to the present embodiment is constituted by the upstream member 218 and the downstream member 220, and the vortex street path 226 is constituted by the two members. Accordingly, in a case in which the upstream member 218 is molded by injection molding, molds M1 and M2 are divided from each other at part of the collision portion 230 so that the molds M1 and M2 can be removed from the upstream side and the downstream side, respectively. Similarly, in a case in which the downstream member 220 is molded, molds M3 and M4 are divided from each other at the boundary between the vortex street path 226 and the discharge path 228 so that the molds M3 and M4 can be removed from the upstream side and the downstream side, respectively. Thus, the upstream member 218 and the downstream member 220 can be easily molded by injection molding or the like.

Figure 27:
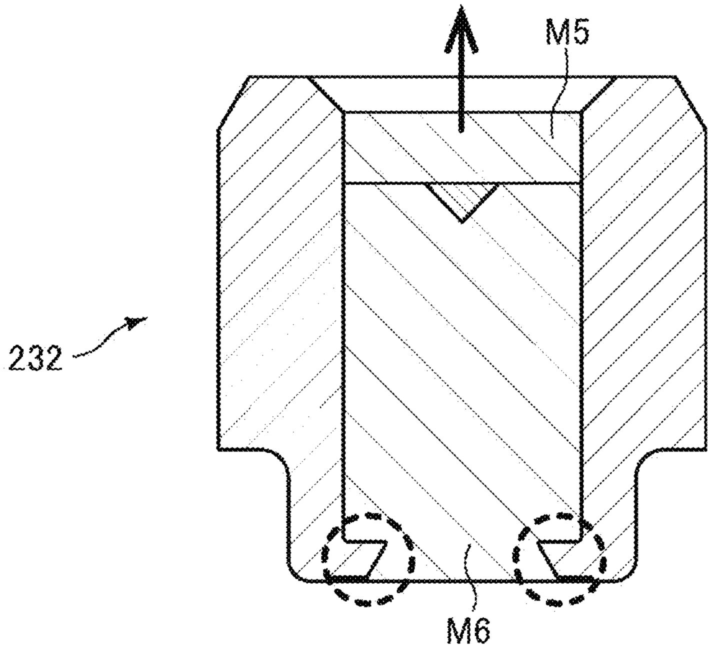
FIG. 27 is a diagram schematically illustrating an integrated vibration generating element.

As for an integrally molded vibration generating element 232 as illustrated in FIG. 27, a mold M5 can be removed from the upstream side in a case in which injection molding is performed, but a mold M6 is engaged with parts surrounded by dashed lines in the drawing. Accordingly, the mold M6 cannot be easily removed from the downstream side, and measures such as selecting an elastically deformable material as a material used for injection molding are needed to enable the easy removal. Thus, there is a certain constraint on material selection or the like in a case in which the vibration generating element is integrally molded, and the divided structure of the vibration generating element 222 as in the present embodiment has a large advantage.

Figure 28:
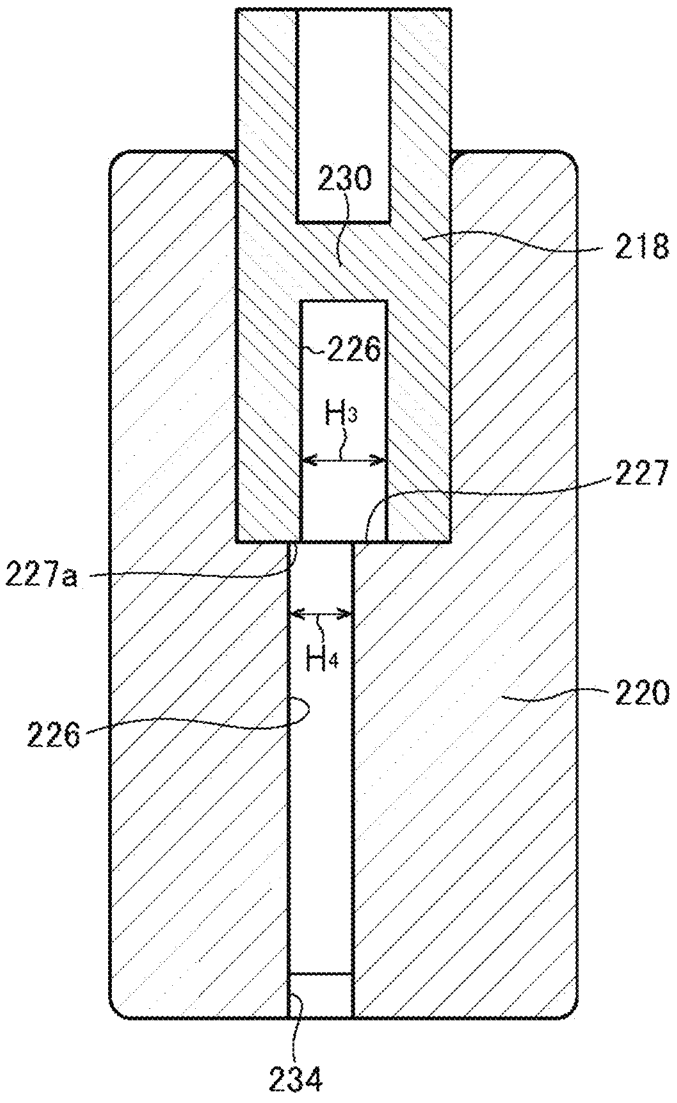
FIG. 28 is a cross-sectional view illustrating a modification of the vibration generating element in the water discharge device according to the third embodiment of the present invention.
Figure 29:
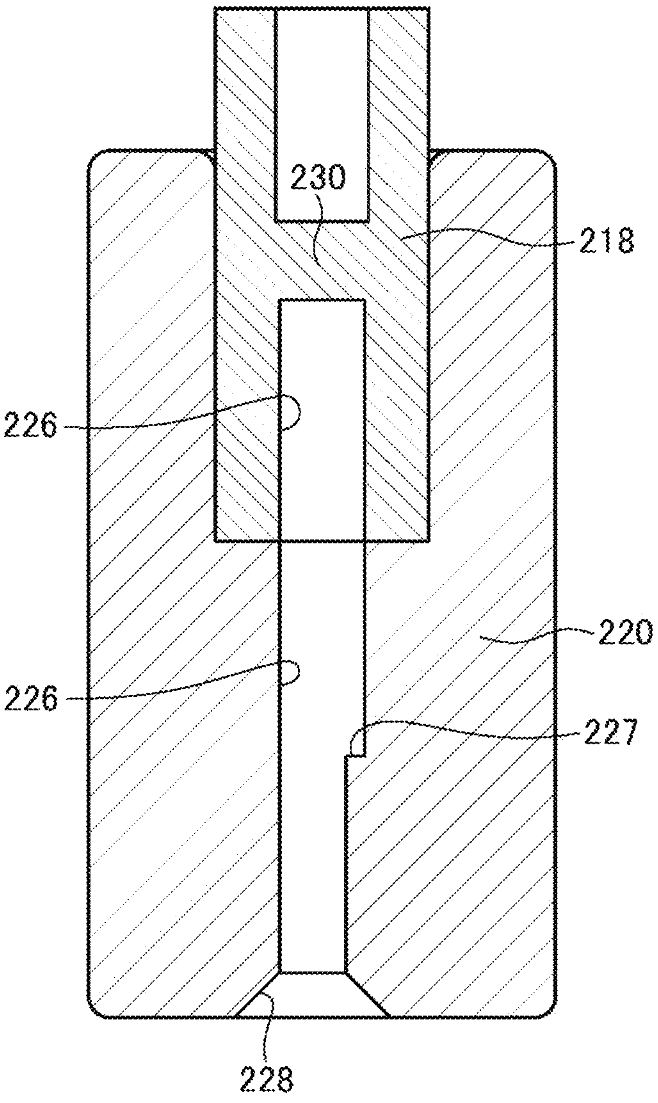
FIG. 29 is a cross-sectional view illustrating a modification of the vibration generating element in the water discharge device according to the third embodiment of the present invention.

Modifications of the third embodiment of the present invention will be described below with reference to FIGS. 28 to 30. In the third embodiment described above, the discharge path 228 has a height that is larger toward downstream as illustrated in FIG. 21. However, as a modification, the entire height of a discharge path 234 may be equal to the height of the vortex street path 226 formed in the downstream member 220 as illustrated in FIG. 28. In the modification illustrated in FIG. 28, a height $H_4$ of the upstream end of the vortex street path 226 provided in the downstream member 220 is smaller than a height $H_3$ of the downstream end of the vortex street path 226 provided in the upstream member 218. Thus, in a case in which error occurs in assembly of the upstream member 218 and the downstream member 220, a stepped portion that narrows the flow passage through the vortex street path toward downstream in the height direction can be reliably formed.

In the third embodiment described above, the flow diffusion portion 227 is provided at a part where the vortex street path 226 provided in the upstream member 218 and the vortex street path 226 provided in the downstream member 220 are connected as illustrated in FIG. 21. However, in a modification illustrated in FIG. 29, the flow diffusion portion 227 is not provided at the part where the vortex street paths 226 are connected, but is provided halfway through the vortex street path 226 provided in the downstream member 220. According to the modification, the flow diffusion portion 227 can be disposed on the downstream side irrespective of the position where the upstream member 218 and the downstream member 220 are connected. Thus, the distance from the collision portion 230 to the stepped portion can be increased so that vortices can be sufficiently developed before reaching the stepped portion as the flow diffusion portion 227.

Figure 30:
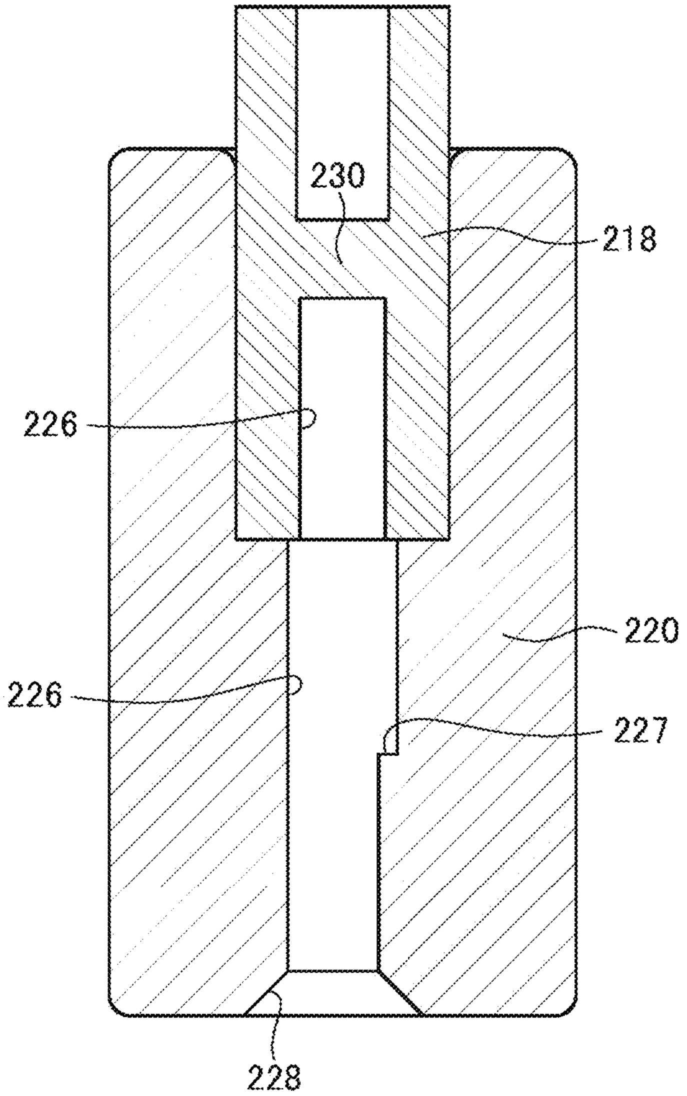
FIG. 30 is a cross-sectional view illustrating a modification of the vibration generating element in the water discharge device according to the third embodiment of the present invention.

Alternatively, as in a modification illustrated in FIG. 30, the flow diffusion portion 227 may be provided halfway through the vortex street path 226 provided in the downstream member 220, and the height of an upstream end portion of the vortex street path 226 formed in the downstream member 220 may be larger than the height of a downstream end portion of the vortex street path 226 formed in the upstream member 218. According to the modification, even when error occurs in connection of the vortex street paths 226 provided in the upstream member 218 and the downstream member 220 due to, for example, error in the dimensions of the members, no stepped portion that narrows the flow passage through the vortex street path 226 in the height direction is formed at the connected part. Thus, a stepped portion formed in the vortex street path 226 of the downstream member 220 can reliably function as the flow diffusion portion 227.

In the water discharge device 201 according to the third embodiment of the present invention, since vortices generated in mutually opposite directions downstream of the collision portion 230 are guided through the vortex street path 226 and discharged from the discharge path 228, discharged water can be reciprocally vibrated in the predetermined vibration plane. Moreover, since a stepped portion that narrows the flow passage through the vortex street path 226 in the height direction is provided as the flow diffusion portion 227 halfway through the vortex street path 226, water discharged from the discharge path 228 is diffused also in the direction orthogonal to the vibration plane. Accordingly, sufficiently large landing area can be ensured with a compact configuration.

In the water discharge device 201 according to the present embodiment, since the height of the discharge path 228 is equal to or larger than the minimum height of the vortex street path 226 (FIG. 21), water diffused in the height direction of the vortex street path 226 by the flow diffusion portion 227 and discharged from the discharge path 228 can be easily diffused in the direction orthogonal to the vibration plane.

In the water discharge device 201 according to the present embodiment, since the vortex street path 226 is constituted by connecting the upstream member 218 and the downstream member 220, the vibration generating element 222 including the water supply path 224, the collision portion 230, the vortex street path 226, and the discharge path 228 can be easily molded.

In the water discharge device 201 according to the present embodiment, since the stepped portion as the flow diffusion portion 227 is formed at the part where the upstream member 218 and the downstream member 220 are connected, the stepped portion can be easily molded as the flow diffusion portion halfway through the vortex street path.

In the water discharge device 201 according to the present embodiment, since the height of the vortex street path 226 provided in the downstream member 220 is constant, collapse of vortices generated when water collides with the collision portion 230 can be reduced, and vortex streets can be reliably guided.

In the water discharge device 201 according to the present embodiment, since the stepped portion as the flow diffusion portion 227 is provided on one of inner wall surfaces facing to each other in the direction parallel to the vibration plane, the height of the vortex street path 226 can be sufficiently ensured downstream of the stepped portion, and thus flow can be diffused in the direction orthogonal to the vibration plane while being reciprocally vibrated in the predetermined vibration plane.

In the water discharge device 201 according to the present embodiment, since the height of the vortex street path 226 is constant downstream of the stepped portion and an inner wall surface of the vortex street path 226 facing the stepped portion is bent to expand the flow passage through the vortex street path 226 toward downstream in the height direction, the direction of water flow passing through the vortex street path 226 can be changed to a direction toward the inner wall surface facing the stepped portion, and thus the water flow can be diffused in the direction orthogonal to the vibration plane.

In the water discharge device 201 according to the present embodiment, since the upstream member 218 is formed of the hard member, deformation of the vortex street path 226 due to water pressure can be reduced at a part on the upstream side where water pressure is relatively high. Moreover, since the downstream member 220 is formed of the soft member, even when a calcium component contained in tap water is accumulated and solidified in the discharge path 228 at the downstream end, the accumulated calcium component (scale) can be easily removed by elastically deforming part of the discharge path 228.

A showerhead that is a water discharge device according to a fourth embodiment of the present invention will be described below with reference to FIGS. 31 to 35. The water discharge device according to the present embodiment is different from that described above in the third embodiment in that a water discharge device body has a cylindrical shape and each built-in vibration generating element includes a bypass path. Thus, in the following, only the differences of the present embodiment from the third embodiment will be described, and description of any same configurations and effects will be omitted.

Figure 31:
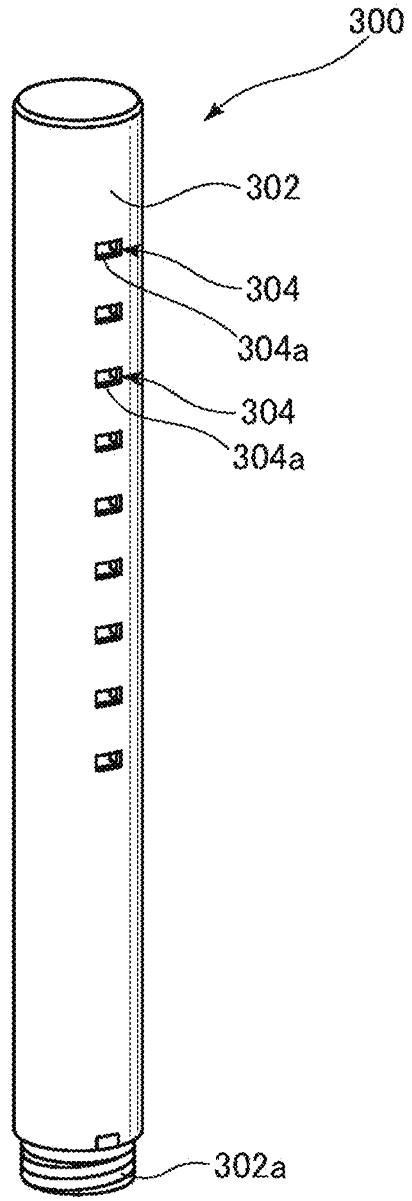
FIG. 31 is a perspective view illustrating the appearance of a showerhead that is a water discharge device according to a fourth embodiment of the present invention.
Figure 32:
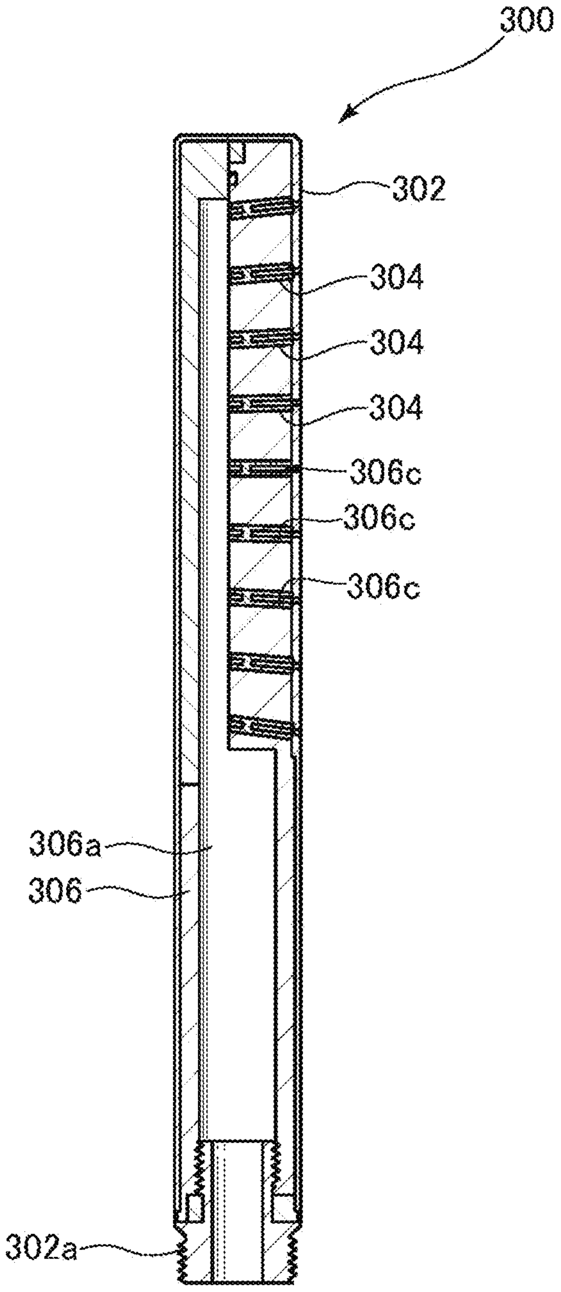
FIG. 32 is a cross-sectional view of the entire showerhead that is the water discharge device according to the fourth embodiment of the present invention.
Figure 33:
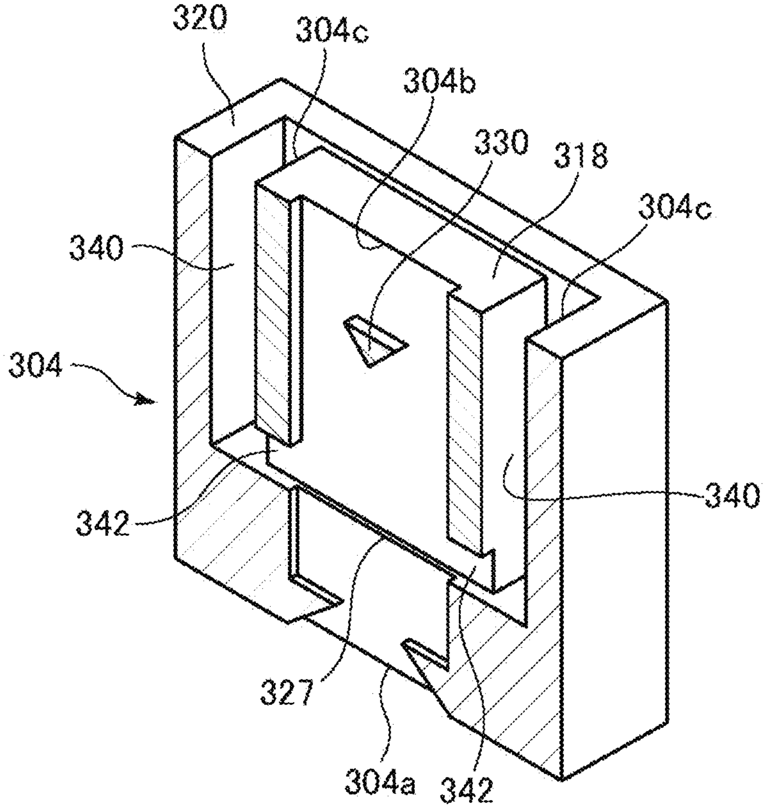
FIG. 33 is a perspective cross-sectional view of a vibration generating element included in the showerhead according to the fourth embodiment of the present invention.
Figure 34:
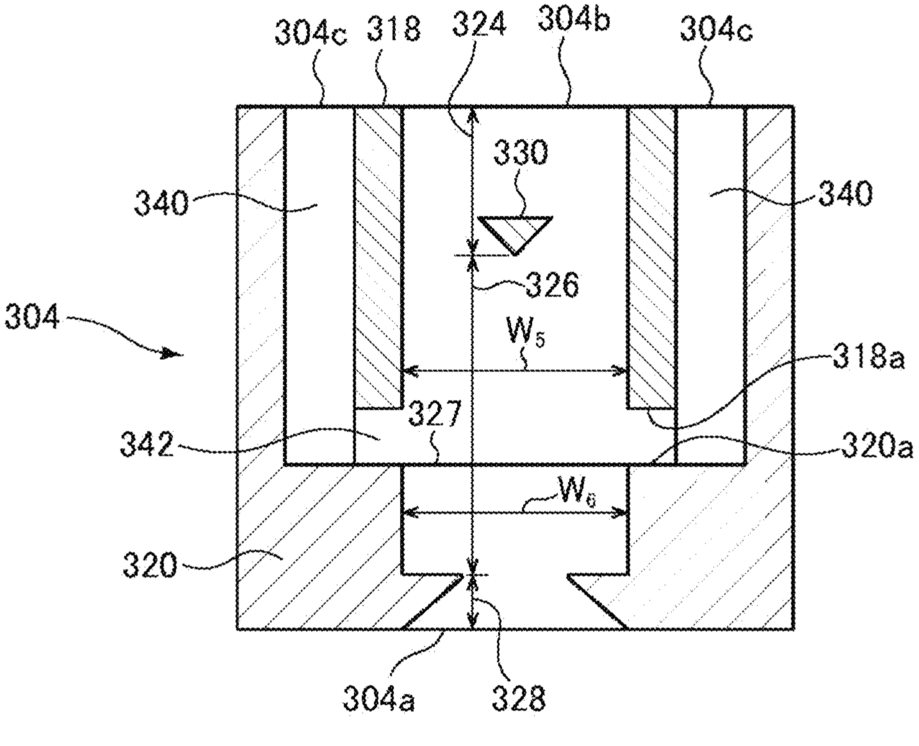
FIG. 34 is a cross-sectional view of the vibration generating element in the showerhead according to the fourth embodiment of the present invention when cut in a direction parallel to the vibration plane.
Figure 35:
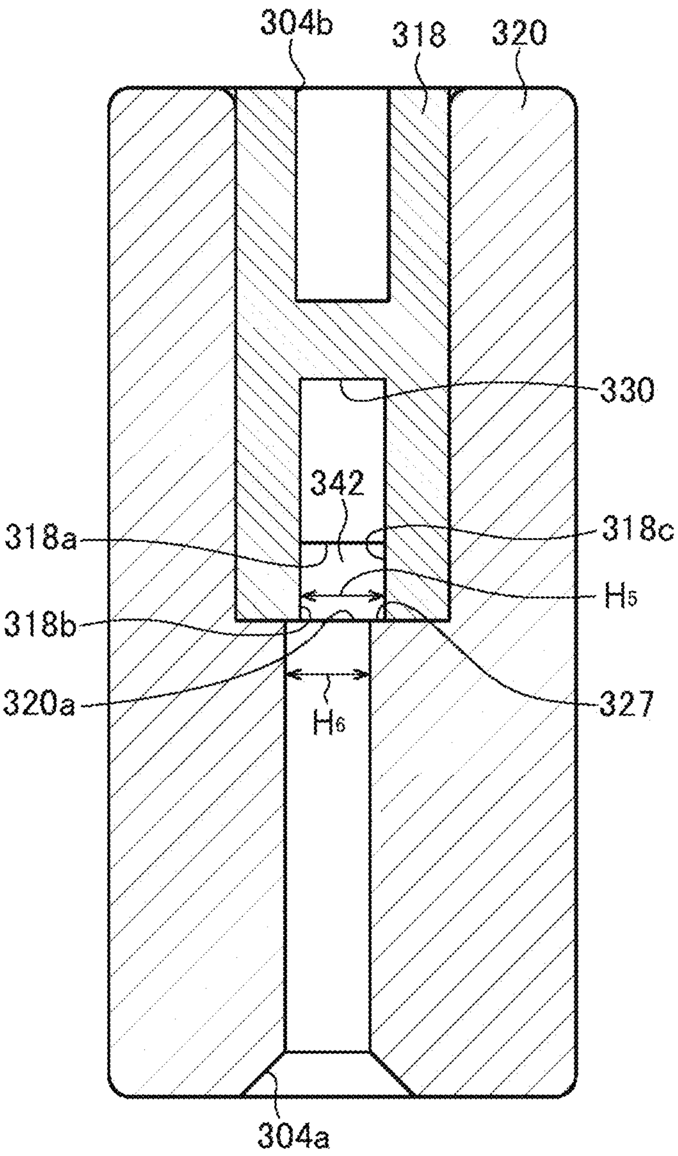
FIG. 35 is a cross-sectional view of the vibration generating element in the showerhead according to the fourth embodiment of the present invention when cut in a direction orthogonal to the vibration plane.

FIG. 31 is a perspective view illustrating the appearance of the showerhead according to the fourth embodiment of the present invention. FIG. 32 is a cross-sectional view of the entire showerhead according to the fourth embodiment of the present invention. FIG. 33 is a perspective cross-sectional view of a vibration generating element included in the showerhead according to the fourth embodiment of the present invention. FIG. 34 is a cross-sectional view of the vibration generating element when cut in the direction parallel to the vibration plane, and FIG. 35 is a cross-sectional view of the vibration generating element when cut in the direction orthogonal to the vibration plane.

As illustrated in FIG. 31, a showerhead 300 according to the present embodiment includes a showerhead body 302 that is a substantially cylindrical water discharge device body, and nine vibration generating elements 304 embedded alongside in line in an axial direction in the showerhead body 302. When water is supplied to the showerhead 300 according to the present embodiment from a shower hose (not illustrated) connected to a proximal end portion 302*a* of the showerhead body 302, water is discharged from water discharge ports 304*a* of the respective vibration generating elements 304 while being reciprocally vibrated.

The internal structure of the showerhead 300 will be described below with reference to FIG. 32. As illustrated in FIG. 32, a cold water passage forming member 306 that forms a cold water passage and holds the vibration generating elements 304 is built in the showerhead body 302. The cold water passage forming member 306 is a substantially cylindrical member and forms a flow passage of water supplied inside the showerhead body 302. The shower hose (not illustrated) is connected in a watertight manner to a proximal end portion of the cold water passage forming member 306. A main cold water passage 306*a* extending substantially in the axial direction is formed inside the cold water passage forming member 306.

In addition, in the cold water passage forming member 306, nine element insertion holes 306*c* in which the respective vibration generating elements 304 are inserted and held are formed to communicate with the main cold water passage 306*a*. The element insertion holes 306*c* are formed from an outer peripheral surface of the cold water passage forming member 306 to the main cold water passage 306*a*. The element insertion holes 306*c* are formed alongside in line in the axial direction at substantially equal intervals. With this configuration, water having flowed into the main cold water passage 306*a* of the cold water passage forming member 306 flows into each vibration generating element 304 held by the cold water passage forming member 306 from the back side of the vibration generating element 304 and is discharged from the corresponding water discharge port 304*a* provided on the front side of the vibration generating element 304.

The configuration of each vibration generating element 304 built in the showerhead according to the present embodiment will be described below with reference to FIGS. 33 to 35. As illustrated in FIGS. 33 to 35, the vibration generating element 304 is a rectangular parallelepiped member that is substantially uniformly thin, the water discharge port 304*a* that is rectangular is provided at an end face of the vibration generating element 304 on the front side, a main inflow port 304*b* is formed at the center of an end face of the vibration generating element 304 on the back side, and bypass inflow ports 304*c* are provided on the respective sides of the main inflow port 304*b*. When the vibration generating element 304 is inserted into the element insertion holes 306*c*, the main inflow port 304*b* and the bypass inflow ports 304*c* communicate with the main cold water passage 306*a* of the cold water passage forming member 306.

Each vibration generating element 304 is constituted by two members of an upstream member 318 and a downstream member 320, and the upstream member 318 is inserted into the downstream member 320 from the back side. With this configuration, a second water supply path 340 is formed between each side surface of the upstream member 318 and the corresponding inner wall surface of the downstream member 320.

As illustrated in FIG. 34, a water supply path 324, a vortex street path 326, and a discharge path 328 are formed in order from the upstream side inside each vibration generating element 304. In addition, a collision portion 330 is provided at a downstream end portion of the water supply path 324. The water supply path 324 and the upstream side of the vortex street path 326 are formed inside the upstream member 318, and the downstream side of the vortex street path 326 and the discharge path 328 are formed inside the downstream member 320.

The water supply path 324 is a straight path having a rectangular section with a constant cross-sectional area and extending from the main inflow port 304*b* on the back side of the vibration generating element 304.

The vortex street path 326 is a path having a rectangular section and continuously provided with the water supply path 324 downstream of the water supply path 324. Specifically, in the present embodiment, the water supply path 324 and the upstream side of the vortex street path 326, which are provided inside the upstream member 318, extend in line with identical sectional shapes. The downstream side of the vortex street path 326 is provided inside the downstream member 320.

As illustrated in FIG. 35, a height $H_6$ of an upstream end of the vortex street path 326 formed in the downstream member 320 is equal to a height $H_5$ of a downstream end of the vortex street path 326 formed in the upstream member 318. The vortex street paths 326 in the downstream member 320 and the upstream member 318 are connected to each other with a shift in the height direction, and a flow diffusion portion 327 is formed at a part where the vortex street paths 326 are connected. Specifically, a stepped portion as the flow diffusion portion 327 that narrows a flow passage through the vortex street path 326 toward downstream in the height direction is formed at the part where the vortex street path 326 in the downstream member 320 and the vortex street path 326 in the upstream member 318 are connected. When part of water flowing through the vortex street path 326 collides with the "stepped portion", water flow is diffused in the direction orthogonal to the vibration plane. As illustrated in FIG. 34, a width $W_6$ of the vortex street path 326 at an upstream end of the downstream member 320 is equal to a width $W_5$ of the vortex street path 326 at a downstream end of the upstream member 318.

The discharge path 328 is a path provided on the downstream side to communicate with the vortex street path 326 and has a width that increases toward downstream. The discharge path 328 has a constant height. The flow passage cross-sectional area at an upstream end of the discharge path 328 is smaller than the flow passage cross-sectional area of the vortex street path 326, and water flow including vortex streets guided through the vortex street path 326 is narrowed and discharged from the water discharge port 304*a*.

Bypass paths 342 each having a rectangular section are provided facing each other at respective side surfaces of the vortex street path 326. Water having flowed in from each second water supply path 340 passes through the corresponding bypass path 342 and flows from the corresponding side surface of the vortex street path 326 into the vortex street path 326 on the downstream side of the collision portion 330. Each bypass path 342 is provided at a part where the upstream member 318 and the downstream member 320 are connected. Specifically, part of the inner wall surface forming the bypass path 342 is provided in the downstream member 320, and the remaining part is provided in the upstream member 318.

In the present embodiment, as illustrated in FIGS. 34 and 35, only an inner wall surface 320*a* positioned most downstream and constituting the bypass paths 342 is provided in the downstream member 320 whereas other inner wall surfaces 318*a*, 318*b*, and 318*c* are provided in the upstream member 318. As described above, in the present embodiment, the bypass paths 342 are provided in the part where the upstream member 318 and the downstream member 320 are connected. Accordingly, a mold (not illustrated) for molding each bypass path 342 does not need to have a configuration with which the mold is removed in the direction of the bypass path 342 (toward a side), and the vibration generating element 304 including the bypass paths 342 can be easily molded.

As a modification, the present invention may have a configuration in which only the inner wall surface 318*a* positioned most upstream is formed in the upstream member 318 whereas the other inner wall surfaces 318*b*, 318*c*, and 320*a* are formed in the downstream member 320. Alternatively, the present invention may have a configuration in which the inner wall surface 318*a* is formed in the upstream member 318, the inner wall surface 320*a* is formed in the downstream member 320, and the inner wall surfaces 318*b* and 318*c* are formed by the upstream member 318 and the downstream member 320.

The collision portion 330 formed at a downstream end of the water supply path 324 is provided to block part of a flow passage section of the water supply path 324. The collision portion 330 is a triangular prism part extending to couple facing wall surfaces (ceiling surface and floor surface) of the water supply path 324 in the height direction and disposed as an island at the center of the water supply path 324 in the width direction. The collision portion 330 has a section formed in an isosceles right triangle shape and is disposed such that the hypotenuse is orthogonal to a center axis line of the water supply path 324 and the right angle of the isosceles right triangle is positioned on the downstream side.

Since the collision portion 330 is provided, Karman vortices are generated downstream of the collision portion 330, and water discharged from the water discharge port 304*a* is reciprocally vibrated. As described above, the bypass paths 342 are provided facing each other on the respective side surfaces of the vortex street path 326, and water having passed through the bypass paths 342 from the second water supply path 340 flows into the vortex street path 326. Accordingly, the bypass paths 342 generate water inflow in a direction orthogonal to a direction in which the vortex street path 326 extends.

Hot/cold water from the bypass paths 342 joins flow including Karman vortices formed by the collision portion 330 from sides. In other words, water having flowed in through the bypass paths 342 flows into the vortex street path 326 by bypassing the collision portion 330.

In this manner, in the vortex street path 326, water from each bypass path 342 joins flow including Karman vortices formed by the collision portion 330, and thus change of the flow speed at the water discharge port 304*a* along with the progress of vortex streets is small. Accordingly, deflection of water discharged from the discharge path 328 is small, and the vibration amplitude of sprayed water in the vibration plane is small. Thus, the vibration amplitude of water can be freely designed by setting, as appropriate, the ratio of the flow rate of water flowing into the vortex street path 326 through the collision portion 330 and the flow rate of water flowing in from the bypass paths 342. Moreover, water flowing inside the vortex street path 326 is moderately diffused in the height direction of the vortex street path 326 by the flow diffusion portion 327 provided halfway through the vortex street path 326. Accordingly, water discharged from the discharge path 328 is diffused also in the direction orthogonal to the vibration plane.

In the water discharge device according to the fourth embodiment of the present invention, since each vibration generating element 304 includes the bypass paths 342 (FIG. 33), for example, the amplitude of reciprocal vibration of water discharged from the vibration generating element 304 can be adjusted also by the flow rate of water flowing in from the bypass paths 342. Moreover, since part of the inner wall surface of each bypass path 342 is formed by the downstream member 320, the vibration generating element 304 including the bypass paths 342 can be easily molded.

In the water discharge device according to the present embodiment, since, in the bypass paths 342, only the inner wall surface 320*a* (FIG. 35) positioned most downstream is formed by the downstream member 320, a part where the flow passage cross-sectional area of the vortex street path 326 changes when the bypass paths 342 are connected and a part where the flow passage cross-sectional area changes when the upstream member 318 and the downstream member 320 are connected can be separated from the collision portion 330 so that vortices formed by the collision portion 330 can be sufficiently developed.

Preferable embodiments of the present invention are described above but may be changed in various manners. The present invention is applied to a showerhead in the above-described embodiments but is also applicable to optional water discharge devices such as a faucet apparatus used at a kitchen sink, a wash stand, or the like, and a hot-water washing device provided at a toilet seat or the like. In the above-described embodiments, a showerhead includes a plurality of vibration generating elements, but a water discharge device may include an optional number of vibration generating elements in accordance with application and may include a single vibration generating element.

In the above-described embodiments, an upstream member and a downstream member are fitted to each other by fitting the upstream member into the downstream member, but the members may be fitted to each other by fitting the downstream member into the upstream member.

Note that, in the above-described embodiments of the present invention, the shape of a path in a vibration generating element is described by using terms such as "width" and "height" for descriptive purposes, but these terms do not restrict a direction in which the vibration generating element is provided, and the vibration generating element may be used in an optional direction. For example, the vibration generating element may be used in a state in which the direction of "height" in the above-described embodiments is aligned with the horizontal direction.

REFERENCE SIGNS LIST

1 water discharge device
10 water discharge device body
10*a* water discharge head unit
10*b* grasping unit
12 water spray plate

12*a* nozzle forming member
12*b* thin plate member
16 water spray nozzle
18 upstream member
18*a* upstream fitting portion
18*b* vibration reducing portion
20 downstream member
20*a* downstream fitting portion
20*b* protrusion portion
22 vibration generating element
24 water supply path
26 vortex street path
28 discharge path
30 collision portion
32 vibration generating element according to comparative example
34 vibration generating element
36 upstream member
36*a* upstream fitting portion
36*b* vibration reducing portion
38 downstream member
38*a* downstream fitting portion
100 showerhead
102 showerhead body
102*a* proximal end portion
104 vibration generating element
104*a* water discharge port
104*b* main inflow port
104*c* bypass inflow port
106 cold water passage forming member
106*a* main cold water passage
106*c* element insertion hole
118 upstream member
118*a* upstream fitting portion
120 downstream member
120*a* downstream fitting portion
124 water supply path
126 vortex street path
128 discharge path
130 collision portion
140 second water supply path
142 bypass path
201 water discharge device
210 water discharge device body
210*a* water discharge head unit
210*b* grasping unit
212 water spray plate
214 functional member
216 water spray nozzle
218 upstream member
220 downstream member
220*a* back surface portion
220*b* front surface portion
222 vibration generating element
224 water supply path
226 vortex street path
227 flow diffusion portion (stepped portion)
227*a* bending portion
228 discharge path
230 collision portion
232 vibration generating element according to comparative example
234 discharge path
300 showerhead
302 showerhead body
302*a* proximal end portion
304 vibration generating element
304*a* water discharge port
304*b* main inflow port
304*c* bypass inflow port
306 cold water passage forming member
306*a* main cold water passage
306*c* element insertion hole
318 upstream member
318*a* inner wall surface
318*b* inner wall surface
318*c* inner wall surface
320 downstream member
320*a* inner wall surface
324 water supply path
326 vortex street path
327 flow diffusion portion
328 discharge path
330 collision portion
340 second water supply path
342 bypass path

The invention claimed is:

1. A water discharge device that discharges water while reciprocally vibrating the water, the water discharge device comprising:

a water discharge device body; and a vibration generating element that is provided in the water discharge device body and discharges water while reciprocally vibrating the water in a predetermined vibration plane, wherein the vibration generating element includes a water supply path into which supplied water flows, a collision portion that is disposed at a downstream end portion of the water supply path to block part of a flow passage section of the water supply path and generates vortices in mutually opposite directions downstream of the collision portion when the water guided through the water supply path collides with the collision portion, a vortex street path that is provided downstream of the water supply path to guide vortices formed by the collision portion, and a discharge path through which the water guided through the vortex street path is discharged, the vortex street path is formed by fitting, to each other, an upstream fitting portion of an upstream member at which an upstream side of the vortex street path is formed and a downstream fitting portion of a downstream member at which a downstream side of the vortex street path is formed, one of the upstream fitting portion and the downstream fitting portion is formed of a material having a first elastic modulus, and the other is formed of a material having a second elastic modulus larger than the first elastic modulus, the upstream member or the downstream member is provided with a vibration reducing portion that reduces vibration of the upstream member due to vortices generated in the vortex street path, and the fitting portion formed of the material having the first elastic modulus among the upstream fitting portion and the downstream fitting portion is elastically deformed by a predetermined amount due to a provision of the vibration reducing portion when the upstream fitting portion and the downstream fitting portion are fitted to each other.

2. The water discharge device according to claim 1, wherein the vibration reducing portion is provided at a part of the upstream fitting portion or the downstream fitting portion at least downstream of the collision portion.

3. The water discharge device according to claim 1, wherein the fitting portion formed of the material having the first elastic modulus among the upstream fitting portion and the downstream fitting portion is elastically deformed at least in a direction parallel to the vibration plane due to the provision of the vibration reducing portion when the upstream fitting portion and the downstream fitting portion are fitted to each other.

4. The water discharge device according to claim 1, wherein the fitting portion formed of the material having the first elastic modulus among the upstream fitting portion and the downstream fitting portion is elastically deformed in a direction parallel to the vibration plane and in a direction orthogonal to the vibration plane due to the provision of the vibration reducing portion when the upstream fitting portion and the downstream fitting portion are fitted to each other.

5. The water discharge device according to claim 1, wherein the water discharge device body is provided with a plurality of the vibration generating element, and a plurality of the downstream member of the vibration generating elements are integrated.

6. The water discharge device according to claim 1, wherein the water discharge device body is provided with a plurality of the vibration generating element, a plurality of the downstream member of the vibration generating elements are integrated while a plurality of the upstream member of the plurality of vibration generating elements are separated.

7. The water discharge device according to claim 1, wherein the vibration reducing portion is formed as a ribbed protrusion provided on a surface of the upstream fitting portion or the downstream fitting portion.

8. The water discharge device according to claim 1, wherein the vortex street path is formed with a width in a direction parallel to the vibration plane and a height in a direction orthogonal to the vibration plane, the width being larger than the height, and a flow diffusion portion is provided at an intermediate portion of the vortex street path, and the flow diffusion portion is constituted by a stepped portion formed to narrow the vortex street path on a-toward downstream side of the vortex street path in a height direction, and the stepped portion has a height equal to or smaller than 50% of the height of the vortex street path.

9. The water discharge device according to claim 8, wherein the discharge path has a height equal to or larger than a minimum dimension of the height of the vortex street path.

10. The water discharge device according to claim 8, wherein the vortex street path is formed by connecting the upstream member at which the upstream side of the vortex street path is formed and the downstream member at which the downstream side of the vortex street path is formed.

11. The water discharge device according to claim 10, wherein the stepped portion is formed at a part where the upstream member and the downstream member are connected.

12. The water discharge device according to claim 11, wherein a height at an upstream end of the vortex street path provided in the downstream member is smaller than a height at a downstream end of the vortex street path provided in the upstream member.

13. The water discharge device according to claim 10, wherein the vortex street path provided in the downstream member has a constant height.

14. The water discharge device according to claim 10, wherein the stepped portion is formed at an intermediate portion of the vortex street path formed in the downstream member.

15. The water discharge device according to claim 10, wherein the vibration generating element includes a bypass path through which the water flows into the vortex street path from downstream of the collision portion, and an inner wall surface of the bypass path is partly formed by the downstream member.

16. The water discharge device according to claim 15, wherein, in the bypass path, only the inner wall surface is positioned at a downstream end thereof and the inner wall surface is formed by the downstream member.

17. The water discharge device according to claim 10, wherein the upstream member is formed of the material having the second elastic modulus and the downstream member is formed of the material having the first elastic modulus.

18. The water discharge device according to claim 8, wherein the stepped portion is provided on one inner wall surface facing in the direction parallel to the vibration plane among inner wall surfaces of the vortex street path.

19. The water discharge device according to claim 18, wherein the vortex street path has a constant height in the direction orthogonal to the vibration plane downstream of the stepped portion, and an inner wall surface of the vortex street path facing the stepped portion is bent to expand the vortex street path on a downstream side of the vortex street path in a height direction.

* * * * *